United States Patent [19]

Roeser

[11] Patent Number: 4,921,133
[45] Date of Patent: May 1, 1990

[54] METHOD AND APPARATUS FOR PRECISION PUMPING, RATIOING AND DISPENSING OF WORK FLUIDS

[75] Inventor: John O. Roeser, Carpentersville, Ill.

[73] Assignee: Minnesota Mining and Manufacturing Company, St. Paul, Minn.

[21] Appl. No.: 399,395

[22] Filed: Aug. 24, 1989

Related U.S. Application Data

[63] Continuation of Ser. No. 118,330, Nov. 6, 1987, abandoned.

[51] Int. Cl.$^5$ .............................................. B67D 5/26
[52] U.S. Cl. ..................................... 222/63; 222/639; 222/319; 222/333; 222/409

[56] References Cited

U.S. PATENT DOCUMENTS

| | | | |
|---|---|---|---|
| 3,180,350 | 4/1965 | Rill | 366/161 |
| 3,443,520 | 5/1969 | Nejame | 366/161 |
| 3,521,789 | 7/1970 | Kraft | 222/134 |
| 3,665,980 | 5/1972 | Croslin et al. | 222/63 X |
| 3,887,110 | 6/1975 | Porter | 222/63 X |
| 4,008,829 | 2/1977 | Chandra et al. | 222/63 |
| 4,090,695 | 5/1978 | Stone et al. | 222/63 X |
| 4,126,399 | 11/1978 | Schneider | 366/161 |
| 4,223,806 | 9/1980 | Buschmann | 222/63 X |
| 4,275,822 | 6/1981 | Juffa et al. | 222/63 |
| 4,279,360 | 7/1981 | Hauser | 222/63 X |
| 4,331,262 | 5/1982 | Snyder | 222/63 X |
| 4,475,666 | 10/1984 | Bilbrey et al. | 222/63 X |
| 4,693,984 | 9/1987 | Minton et al. | 222/319 X |

OTHER PUBLICATIONS

Robotics, Inc., Sales Literature published at least as early as Mar. 3, 1987.

Primary Examiner—Kevin P. Shaver
Assistant Examiner—Gregory L. Huson
Attorney, Agent, or Firm—Robert D. Silver

[57] ABSTRACT

A pump/dispenser, ratioing/mixer dispenser apparatus and a method and apparatus for precision vacuum degassed dispensing of work liquids are presented. The pump/dispenser is a positive displacement high precision piston/cylinder constant flush type with piston smaller than chamber. The piston is advanced along its stroke in tiny repeatable adjustably programmable steps, the infinitely adjustable precision ratioing programmable mixing being provided when two such pumps are used. The vacuum degassed work liquids dispensing system features the creation and maintenance of a positive absolute pressure on the work liquid(s) when exiting the degassing chamber(s) to the dispensing outlet(s) whether moved along the flow path through the precision dispensing pump(s) or other types of pump(s). Available softwear and adjustable programmable precision hardwear of the system may be provided by a widely available personal computer. Further degassing is provided by dispensing in a vacuum.

12 Claims, 20 Drawing Sheets

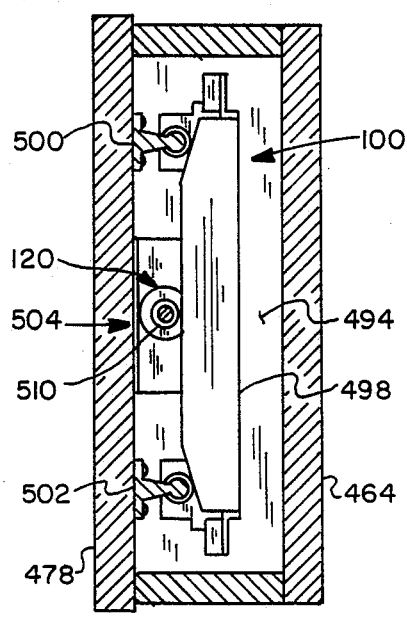
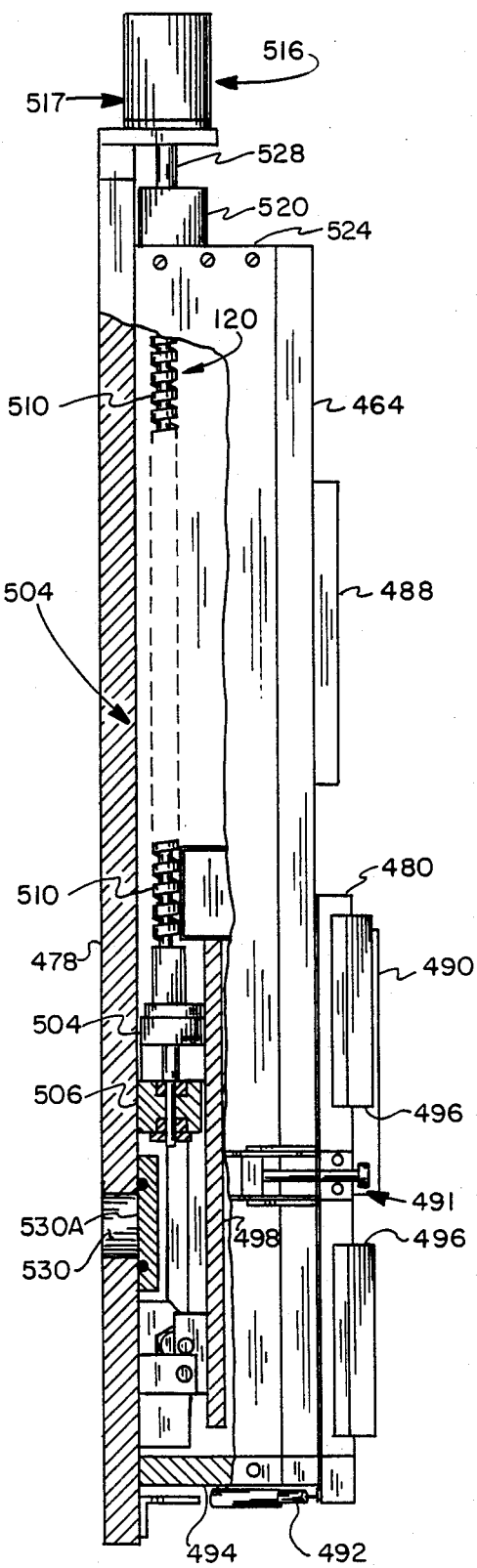
FIG. 12
FIG. 13

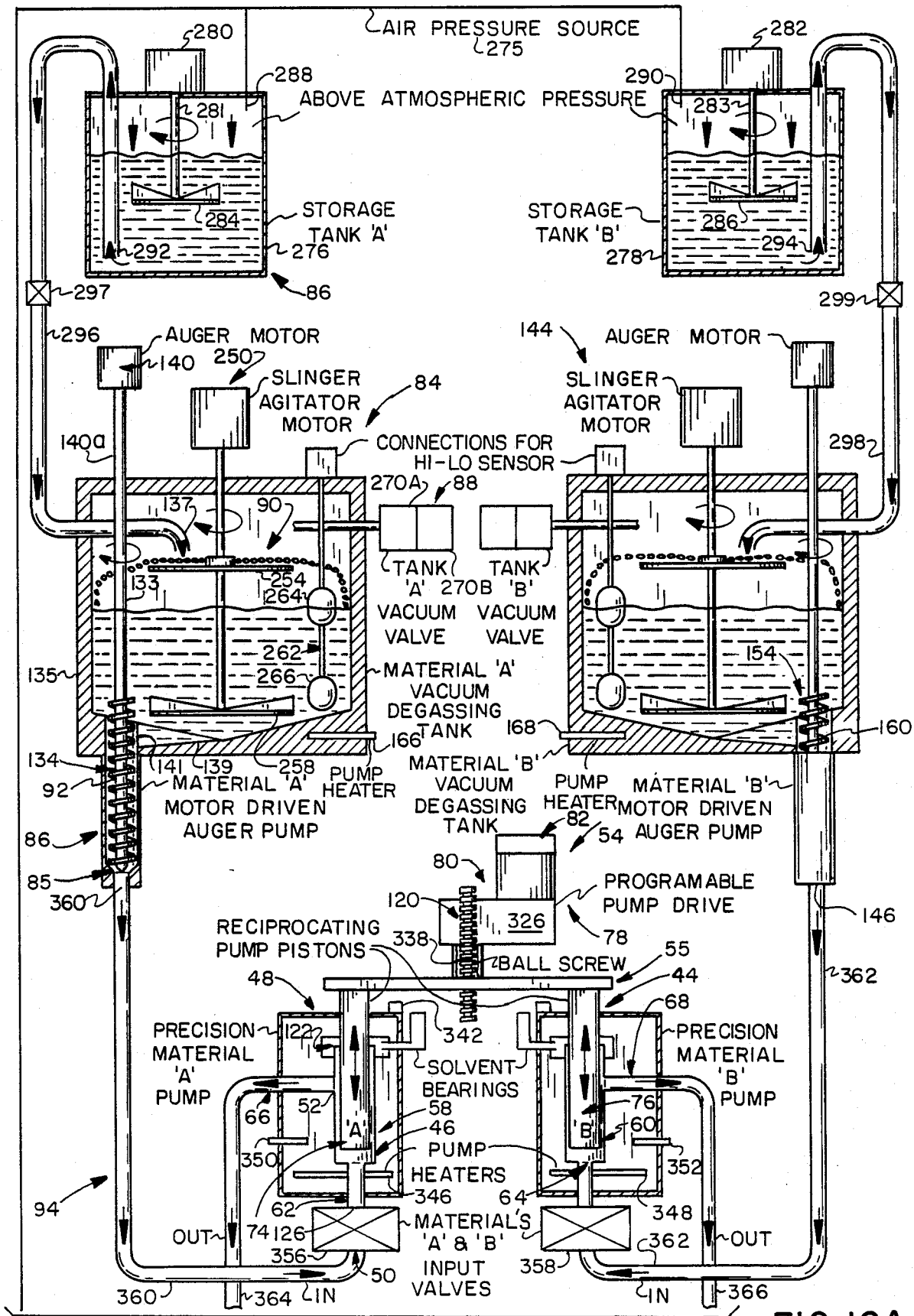

METHOD AND APPARATUS FOR PRECISION PUMPING, RATIOING AND DISPENSING OF WORK FLUIDS

This is continuation of application Ser. No. 118,330, filed Nov. 6, 1987, now abandoned.

BACKGROUND OF THE INVENTION

This invention relates to precision pumping, precision ratioing and mixing, precision vacuum degassing of work liquids and precision dispensing; both apparatus and method, certain of which have utility alone or in various combinations. The new precision pump/dispensing and precision mixing mechanisms are particularly useful in and shown in the environment of a new method and apparatus for vacuum dispensing and degassing of work liquids but are also very useful in other methods of dispensing of single or multi-component work fluids.

Thus, while the instant invention will be discussed in the art of vacuum dispensing which it advances, it will be appreciated that controlled repeatable programmable precision pumping for non-vacuum dispensing, and the controlled programmable precision mixing/ratioing of work liquids for non-vacuum dispensing, each have many applications outside of the vacuum degassed work fluid dispensing field.

High precision electrical and electronic products may require void free encapsulation of electrical/electronic components so that electrical/electronic characteristics are repeatable within very very close tolerances during production runs on a plurality of work parts. Minute cavities in encapsulation materials filled with gas (in materials such as epoxys, silicones, urethanes, etc.) can cause change of the electrical characteristics of the encapsulation material on the workpiece. Where ultra high precision is required, many of these two party materials are both degassed by vacuum techniques prior to dispensing and then dispensed under a vacuum so as to completely or almost completely degas such materials. Further the degree of precision of electrical characteristics in certain depositions also require exquisite precision control of pumping, ratioing, mixing and viscosity of the deposited work materials since the physical/chemical properties, the volume and exactness in location of the deposited work liquid materials all are capable of affecting the electrical characteristics and are therefore affected by such control.

In the apparatus and system under discussion, there is featured two part material dispensing under vacuum, wherein the work fluid materials are degassed prior to and after dispensing. Also adjustable programmable shot size of the mixed materials for precision volume dispensing is featured, with simultaneous precise ratioing of the work fluid and work part indexing control. Further the entire apparatus and system features adjustable programmable operations for single time or automatic repeatable operations. The complete control of the material flow (temperature, vacuum, pressure, etc.), the pumping (frequency and amount), and the ratioing, mixing, dispensing operations are controlled by a software program which may be used on widely available and well understood personal computers.

In broad brush, a void free production method and apparatus are provided having the work liquids (resin and catalyst) loaded into separate pressurized containers and conveyed to separate vacuum tanks where a whirling disc slings and atomizes the individual work materials unto the walls of their respective tanks. The material then forms a thin film on the sides of the tanks which is degassed by the maintenance of a vacuum in the tank while the work liquid film travels to the bottom of its tank.

The work material(s) is continually agitated in the tank(s) to maintain consistency and keep any fillers in the material(s) in suspension. The material(s) is the positively removed from the tank(s) through an auguring mechanism(s) (in this novel method and system) to then enter the pumping mixing system where the two parts of the work material(s) are brought together and statically or dynamically mixed.

Heretofore in the prior art, materials in a vacuum system were dispensed in a manner whereby a positive pressure was not kept on the work materials downstream of the vacuum tanks. For example, in the mechanism shown in A. L. Kraft U.S. Pat. No. 3,521,789, the degassed liquid leaves the vacuum tank(s) through the action of the metering piston which coacts with the cylinder. However, this apparatus does not keep a positive pressure upon the work materials in the system downstream of the piston throughout the relative movement of piston and cylinder and it appears that negative pressures are possible at transitory times in the normal operation. Thus, over time, in Kraft, a breakdown of seals or joints anywhere in the system downstream of the pump/cylinder will cause a reentrainment of gaseous contaminant into the work material through such failed seals or joints in the system intermediate the pump/cylinder and the dispensing outlet.

In the instant invention, by keeping of a positive pressure on the work materials throughout the system after exit of the vacuum tank(s), the entrainment of gas, when minute failures of seals and joints occur, is prevented so that void free dispensing is not jeopardized.

Additionally, there is located, intermediate the vacuum tanks and the delivery dispensing head(s), an extremely high precision positive displacement pump(s) for high precision control of the delivery of the fluid materials to the mixing head. The degree of precision provided is so different in degree, that it differs in kind from those heretofore used in the art. The control, in broad terms, is accomplished by a computer, a software program, computer peripherals and stepper or servo motors driving a positive displacement flushing action pump/cylinder.

Control of volume of amount of work liquids dispensed is also essential in many sophisticated areas including electronic applications. Primary control is achieved by control of the relative movement of a positive displacement piston and cylinder. Adjustable control allows versatility of work piece throughout. Timing (actuation) control of the pump mechanism affords integration with other automatic techniques and apparatus such as workpiece indexers and movers. It is self-evident that accuracy, both in time and volume, is critical to quality, as measured by precision of both volume dispensed and the location area on the work piece (position) of the dispensed material. Exacting dispensing control is disclosed herein and is provided by the generation of an electrical pulse stream which, through either stepper or servo motors, may be used to actuate the relatively moving element(s) of the pump piston and cylinder. A linear motor or a ball screw mechanism or other drive mechanism such as cable/drum, rack and pinion, or cams may be interposed between the motor output and the piston or cylinder. Alternatively, the motor output may be connected directly to the piston or cylinder. Software and computer peripherals provide generation and control of the pulse stream, both frequency and duration, such that with a computer, control may be provided in programmable fashion. The control is so refined that movements of the pistons(s) relative to cylinder(s) may be easily obtained in the range of 100,000 to 10,000,000 of one inch, (0.00001 to 0.0000001) inches over a substantial range of more than one inch of stroke movement. By simultaneously providing pulse streams to multiple pump/cylinders, control of the multipart work liquids for accurate ratioing therebetween is provided.

Proper viscosity and material uniformity of the work liquids on a consistent basis is necessary for precision dispensing. This can be aided by temperature sensing and control mechanisms for the work liquid materials. To insure precision, temperature sensing and feedback control is provided at the tank and at various other points in the dispensing system, all coordinated through the computer with proper software and hardware.

The workparts which are to be filled or encapsulated (poured) or have dispensing thereon may be disposed in a vacuum dispensing chamber where the actual dispensing will take place. This vacuum dispensing chamber causes further evacuation of any residual gases in the dispensed work material or in the work piece interstices and (at least in batch systems) is preferably organized and operated as a multi-outlet and multi-station apparatus. To this end the material to be dispensed may be routed through a manifold for simultaneous multipart dispensing. For high precision the individual outlets from the manifold my be further controlled by very high precision pinch valves which adjust for different lengths, or routes of travel of, the mixed work liquid after leaving the mixer. Each of the pinch valves have micrometer adjustments for material flow rate adjustments to compensate for distance from the central source input manifold. By this manner, simultaneous high precision multiple dispensing heads may be used while providing part to part precision. Also the pinch valves, when coordinated with the precision pumps, prevents ooze or drip and suck back may be provided. Alternatively, individual output pumps for each dispensing head may be used, their volume adjusted either mechanically or by computer controlled pulse stream.

Thus in general the invention features as the broad object, high precision liquid material dispensing of work liquids.

Further the invention has as an object to provide high precision positive displacement pumping of work liquids which may be pre-selectively adjustably controlled.

A further object is to have a void free work liquid dispensing method and apparatus for production of parts.

Another object of the invention is to have versatile production capabilities in an apparatus and system where the dispensing production may be had under either vacuum circumstances or with open pour.

A further object of the invention is to have high production rate capabilities with multiple port dispensing.

A still further object of the invention is to have a method and apparatus with all operating control through easy programming and recalling of programs operable by relatively unskilled operators.

A further object of the invention is to provide high reliability, low maintenance, compact size and clean design readily adapted for association with other automatic systems.

A still further object of this invention is to provide a high precision versatile apparatus for positive displacement dispensing of a first work liquid, there being operator selective adjustable means for controlling the motion between a pump and a cylinder where the relative motion can be in any repeatable or variable selected time conditioned dependent interval between movements such that a selected constant or variable relative velocity of movement may occur between the pump and the cylinder for high precision pumping in a controlled fashion.

Another object of this invention is to provide an apparatus where the relative movement between the pump and the cylinder may be controlled in repeatable adjustable fashion where the movements are less than 1/100,000 inches over a stroke of in excess of an inch.

A further object is to provide an apparatus and system where the movements between controllable steps are from a perceived practical standpoint, continuous in nature.

A still more specific object of the invention is to provide for relative movement of a cylinder and piston wherein a computer controlled pulse stream provides measured repeatable controlled movement therebetween in discrete increments.

Further and more specific object of the invention is to provide a system and method wherein a precision pump may be respectively used to control each individual work liquid and provide accurate adjustable programmable ratioing of at least two different work liquids in delivery thereof at a mixing head for later dispensing at a dispensing head.

A further object of the invention is to provide an apparatus and method for precision vacuum dispensing where the work material is removed from a degassing chamber so as to maintain a positive pressure on the work liquid above atmospheric pressure throughout the system until delivered at the dispensing head to prevent the later entrainment of unwanted gases through seals or joints after the desired degassing of the work liquid.

BRIEF DESCRIPTION OF THE DRAWINGS

In the drawings, which illustrate the presently preferred embodiments of the invention:

FIG. 12 is a sectional view along lines 12—12 of FIG. 11;

FIG. 13 is a partial sectional view along lines 13—13 of FIG. 11;

FIG. 16A is a semi-diagrammatic flow diagram illustrating the various parts in their relationship of the apparatus of FIG. 1;

DESCRIPTION OF THE PREFERRED EMBODIMENT

Figure 1:
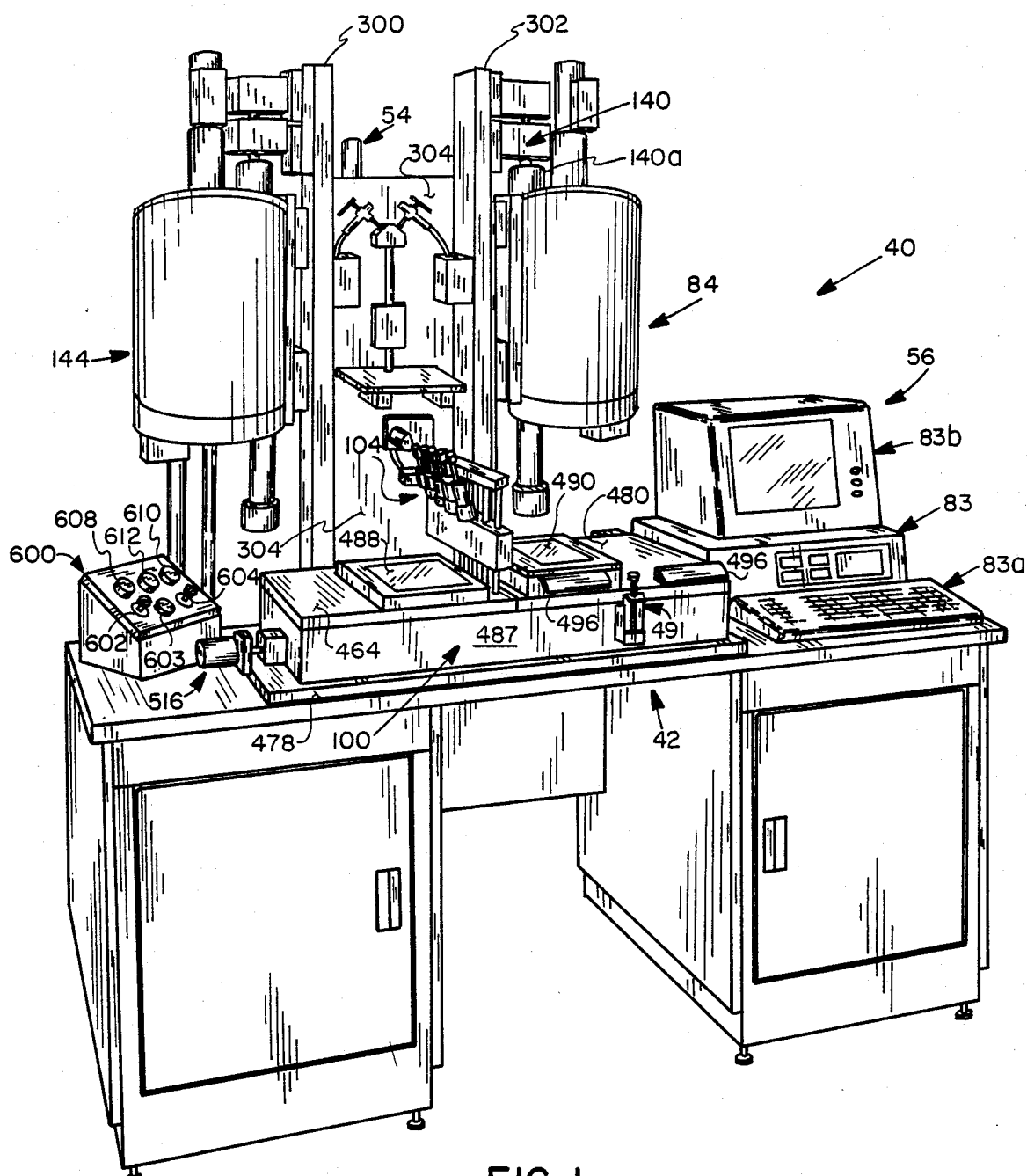
FIG. 1 is a perspective front view of apparatus utilizing the methods of the invention, with some of the small structural components not being shown for clarity.
Figure 2:
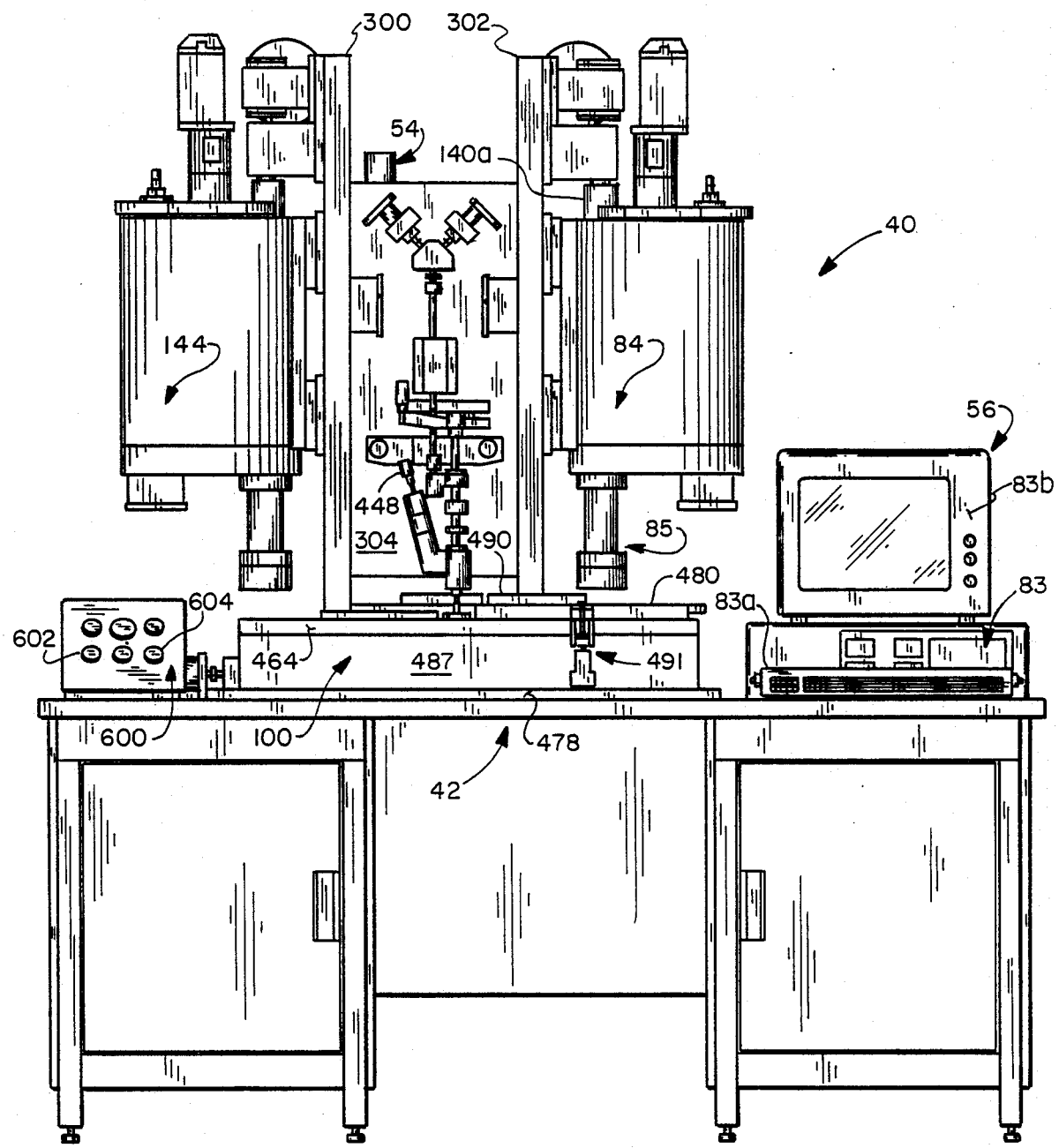
FIG. 2 is a front assembly view (without hoses) showing the apparatus using inventive concepts.
Figure 3:
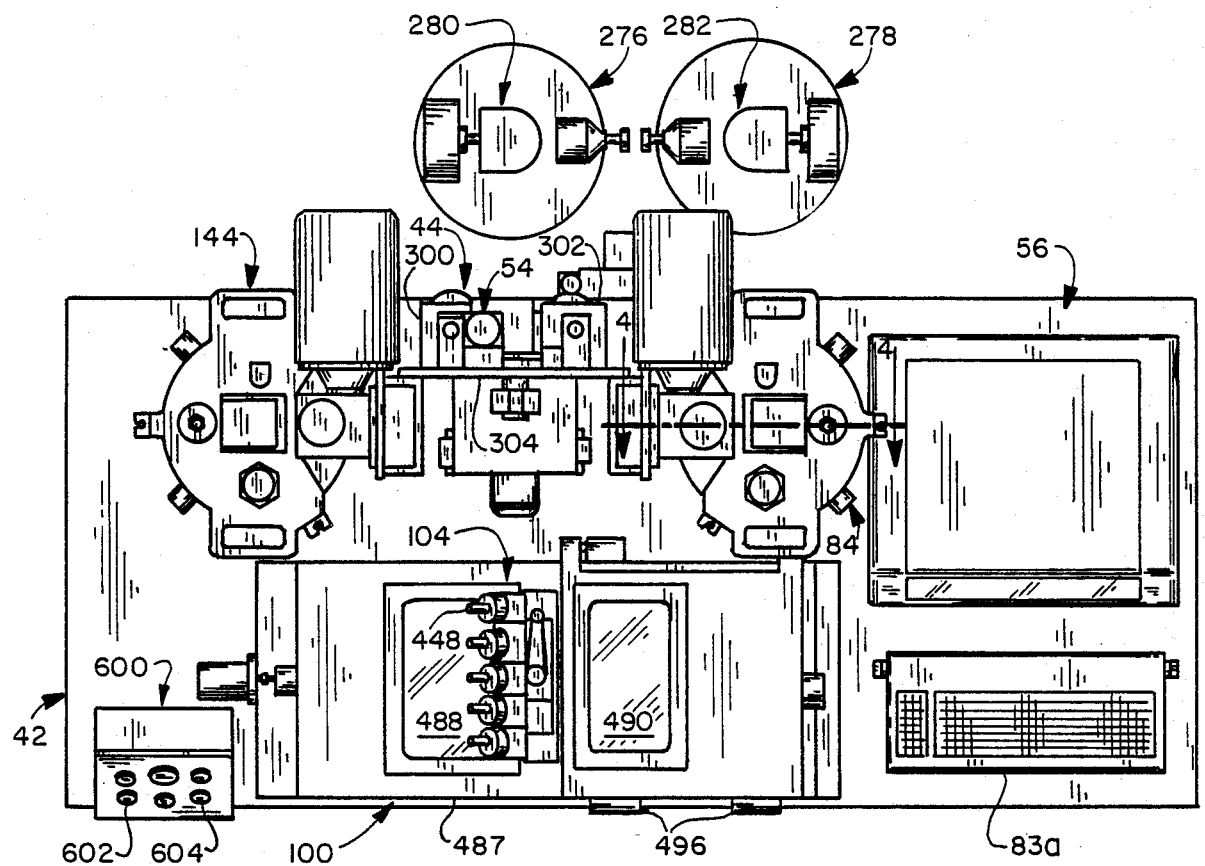
FIG. 3 is a top view of the apparatus shown in FIG. 1.

Referring to FIGS. 1-3, Apparatus 40 has frame means 42, including a vertical extension on a desk like array, for operator attention to various components. The frame means supports the precision pump means 44 at the upper central rear as viewed in FIGS. 1 and 2, as shown in FIG. 3 and in greater detail in FIG. 5. The pump means 44 is also shown semi-diagrammatically in FIG. 16A.

In general the pump means 44 comprises a cylinder means 46 which coacts with the piston means 48 and has an inlet means 50 and outlet means 52. As will be discussed in detail hereinafter, the piston means 48 is smaller than the cylinder means 46, and reciprocatingly advances from a retracted position toward the inlet means 50 to flushingly and turbulently positively displace the contents of the work fluid in cylinder means 46 when the inlet means 50 is closed. This forces work fluid material out the outlet means 52. The construction and geometry of the pump means 44 and its coaction with the work fluid causes a scouring action preventing an acretionary build up of work fluid on the piston means 48 and in the cylinder means 46 whereby a precision volume of work material is pumped on relative movement over repeated strokes or interrupted intervals of a single stroke of the pump means over time.

Motion control means 54 is mounted on the frame means 42 for causing relative movement between the cylinder means 46 and the piston means 48. Herein, the piston means 48 is advanced and retracted relative to the fixed to the frame means 42 cylinder means 46, but it will be appreciated that the cylinder means 46 could be advanced relative to a fixed piston means 48 or both could be simultaneously moved relative to each other.

As shown in FIGS. 1-3, an operator selective adjustable means 56 is provided which comprises a computer, keyboard, software, certain peripherals and electrical connections for programmably controlling the motion control means 54. As will be discussed in detail later, the operator selective adjustable means 56 and the motion control means 54 are programmably operable to selectively repeatably cause relative movement of the piston means and cylinder means in discrete tiny increments or steps on the order of 0.00001 to 0.0000001 inches (sub micron size) over a lengthy stroke of the order of 1-5 inches. The relative movement of piston means 48 and cylinder means 46 may be precisely commenced and stopped, recommenced and stopped and then retreated at any one of the incremental steps that define positions along the stroke. Further the relative movement may be at any repeatable or variable sequence and at any repeatable or variable selected time or condition dependent intervals of movement. The increments of movement are so small and the time between increments are so short that the practical pumping effect is a continuous one rather than pulsating during the relative movement over a number of steps, which causes the dispensing of the work liquids. The hysterisis in the system (backlash) may be accounted for in the programming of the system, particularly if it is repeatable within close limits. In a nutshell, the control is exceedingly fine.

Figure 5:
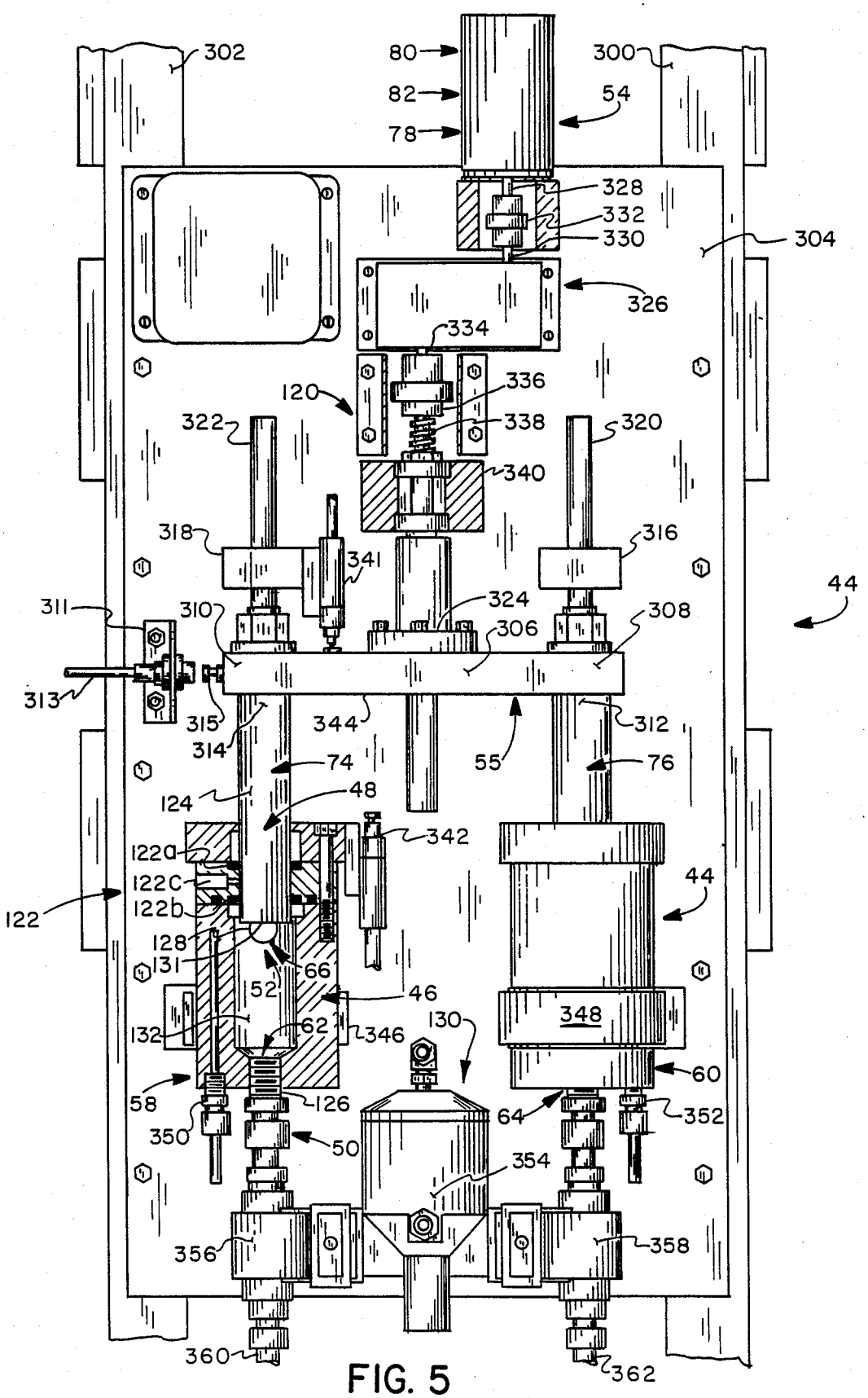
FIG. 5 is a partial vertical view (part in section) of the precision pump apparatus.
Figure 6:
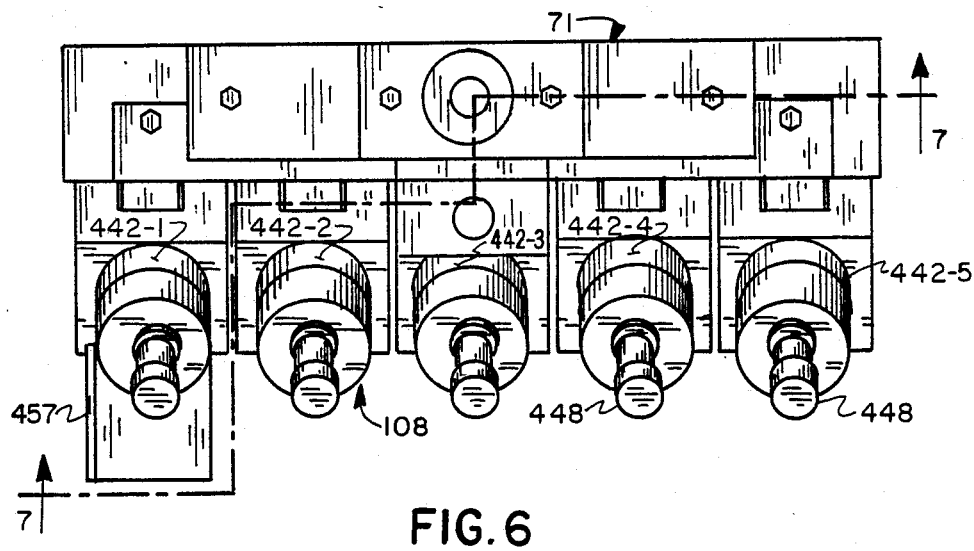
FIG. 6 is an enlarged partial top view of a part of the apparatus located above the dispensing chamber, showing the array of pinch valves.
Figure 7:
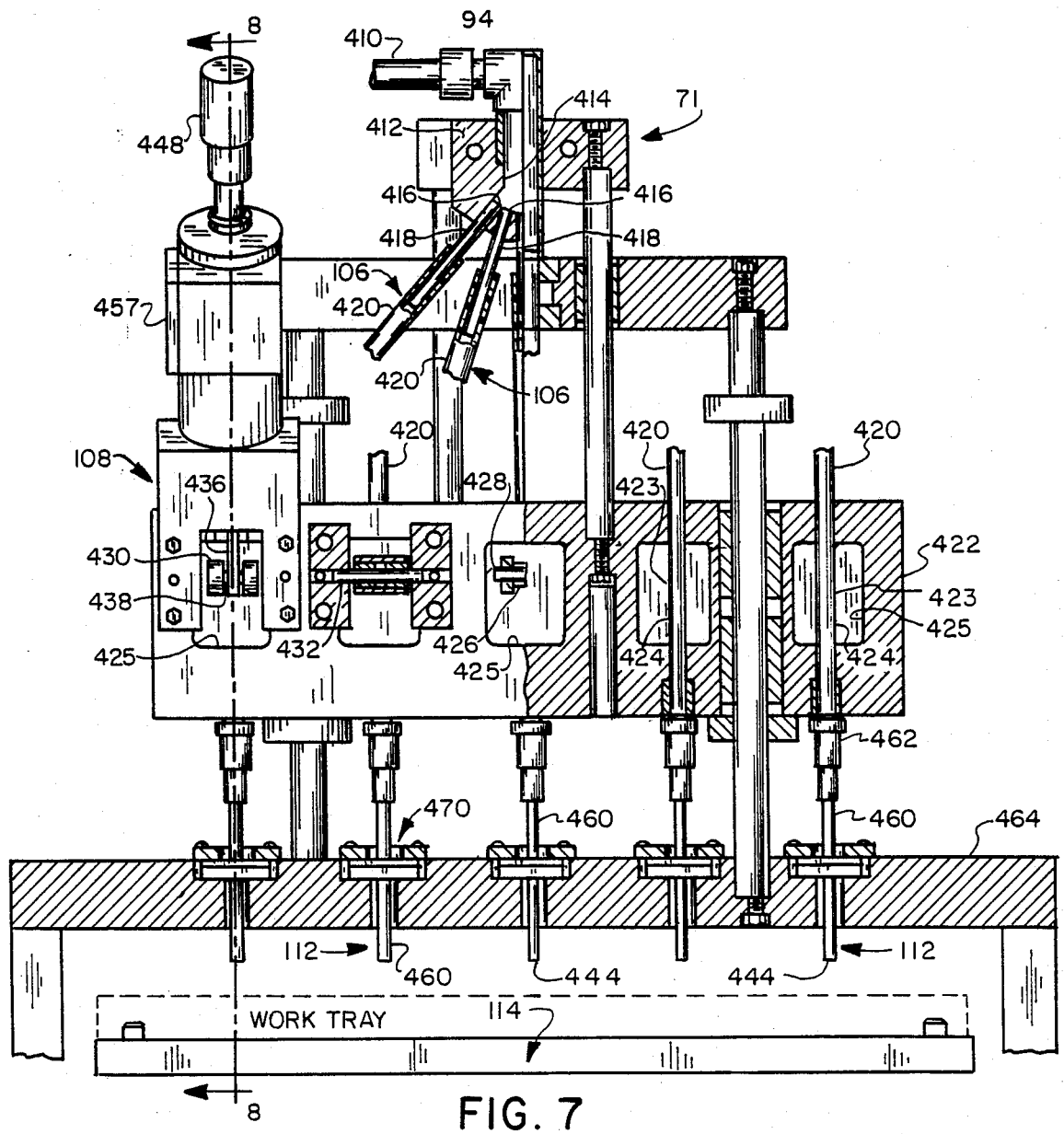
FIG. 7 is a sectional view along lines 7—7 of FIG. 6.
Figure 16B:
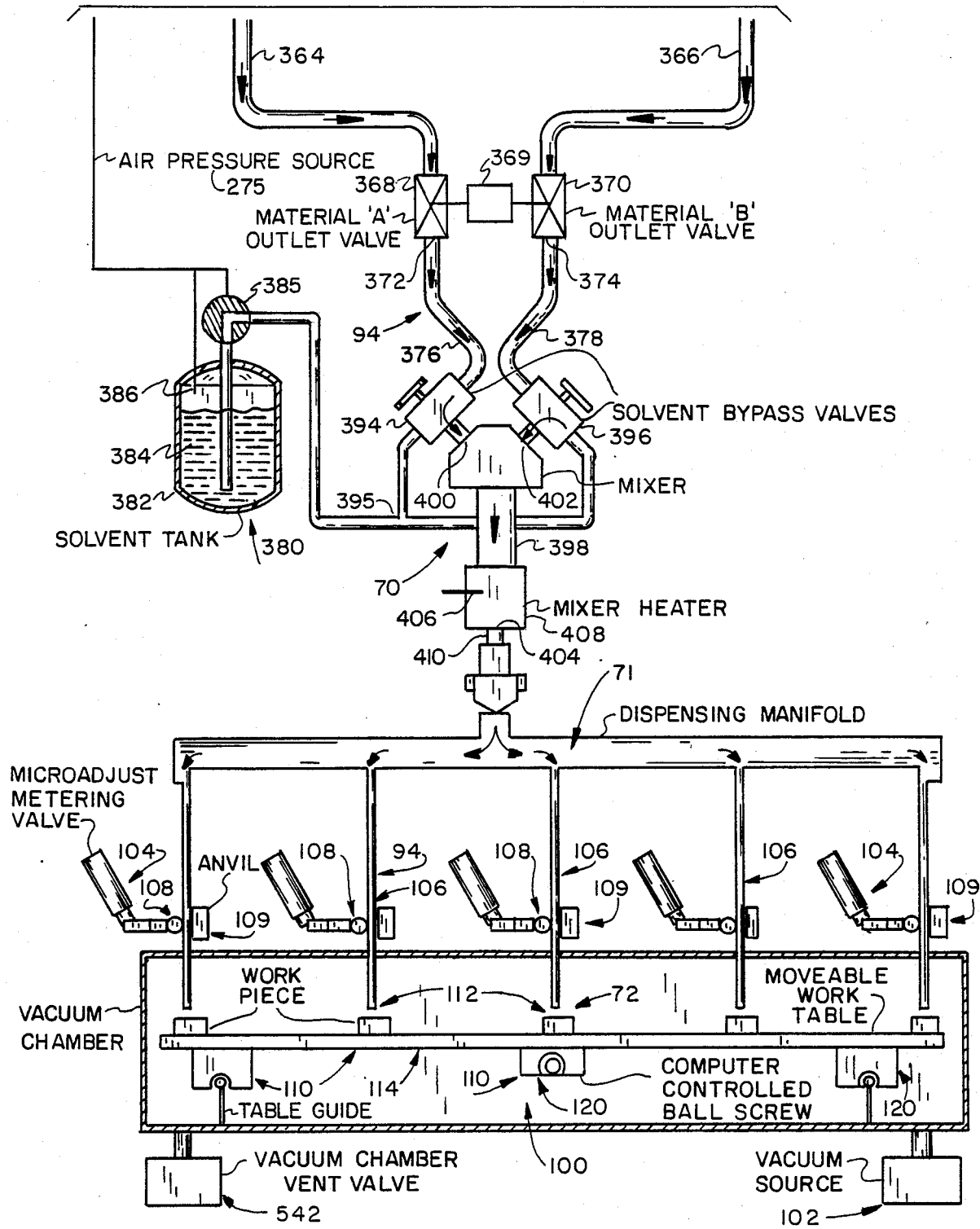
FIG. 16B is a continuation of FIG. 16A.
Figure 17A:
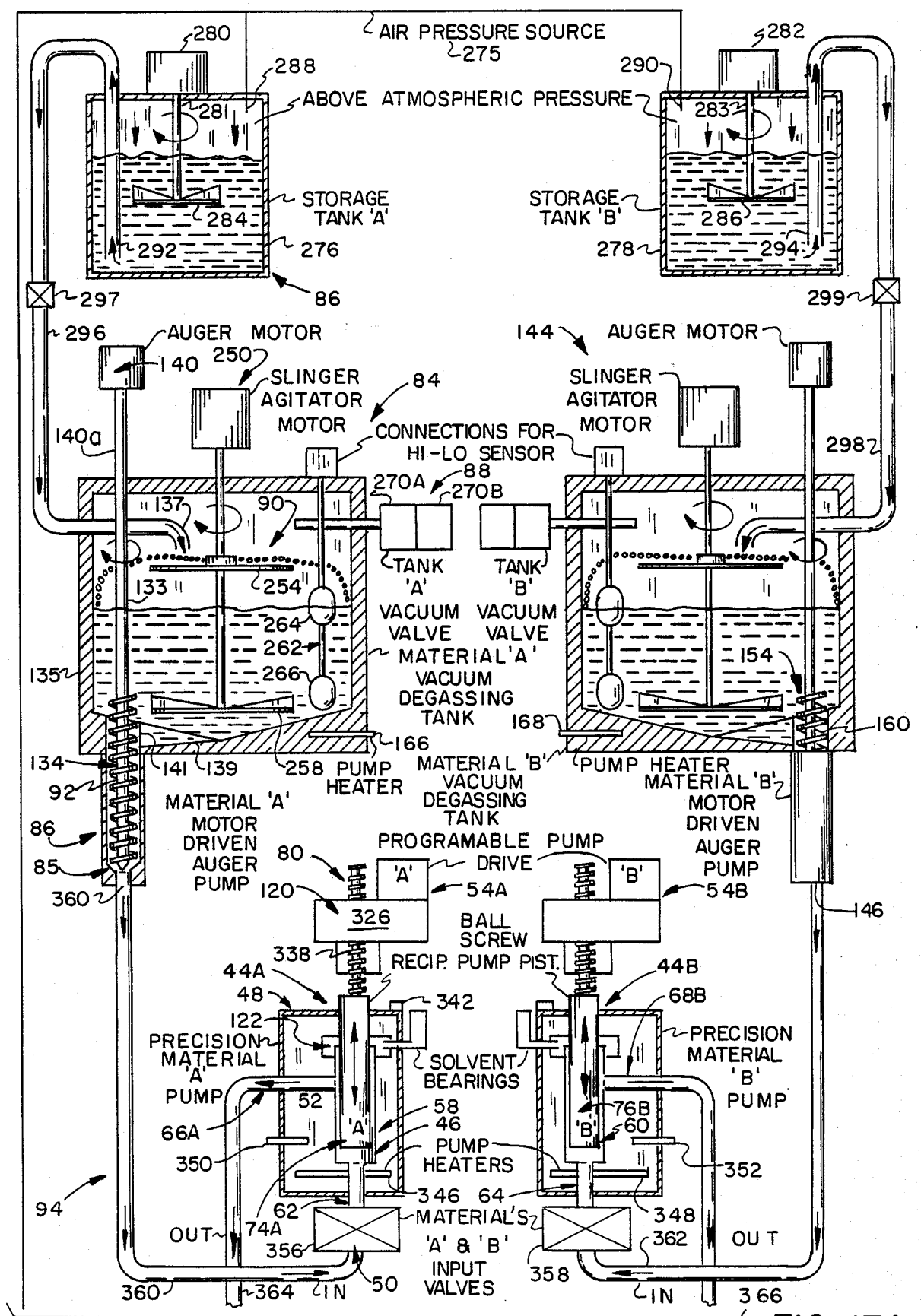
FIG. 17A is a view similar to FIG. 16A showing an alternate form of apparatus using 2 separate pumps.

As shown in semidiagrammatic form in FIG. 17A, two separate motion control means 54A and 54B may be employed with two separate pump means 44A and 44B, each of which are independently under programmable control of the operator selective adjustable means 56 (not shown in this figure) for controlling the individual motion control means 54A and 54B. When multi-work liquids are needed (such as resin and catalyst) and a single usage operation is required or desired calling for a fixed ratioing of work liquids, a single motion control means 54 is required. Thus, in these circumstances the first piston means 74 and second piston means 76 may be mechanically tied together by suitable means 55 (as shown in FIGS. 5 and 16A).

When the first piston means 74 and second piston means 76 jointly move relative to the respectively fixed first and second cylinder means 58 and 60 (see FIGS. 5 and 16A) when the first inlet means 62 and second inlet means 64 are respectively closed, work liquids are respectively displaced through the respective first outlet means 66 and the second outlet means 68 for delivery to the mixing means 70 (see FIG. 16B). At the mixing means 70, the work fluids will be mixed (here shown with a static mixer but it will be appreciated that a dynamic mixer may be used) for delivery to the downstream dispensing outlet means 72. When the delivery of work fluids emanates from first and second outlet means 66A-68B of the form of apparatus of FIGS. 17A and 17B, the ratioing of the work liquids for mixing is controlled by the independent movements of the individual first piston means 74A and second piston means 76B. As will be appreciated, highly precise ratioing is obtained.

The motion control means 54 preferably comprises rotary electric motor means 78 which may be of the type commonly referred to as a stepper motor. Alternatively, it will be appreciated that depending on requirements, an AC or DC servo motor, having functional capabilities and characteristics more particularly described, may be used to drive a pump piston.

One such rotary electric stepper motor found suitable, is the M-Series SLO-SYN stepping motor manufactured by the Superior Electric Company of Bristol, Conn. When a four-step input sequence is used, the motor shaft will advance 1.8 degrees or 200 steps per revolution. By using digital logic and bipolar pulse width modulation to increase the resolution and smoothness, and by proportioning the current levels between the phases of the SLO-SYN motor above mentioned, the 200 step/rev step motor is electronically converted into a 25000 step-revolution device. When the stepper motor output shaft is connected to the pump piston means 74 through a gear mechanism and/or a precision ball screw, stable, smooth low speed motion, submicron positioning and repeatable control of the piston means is available.

Figure 15A:
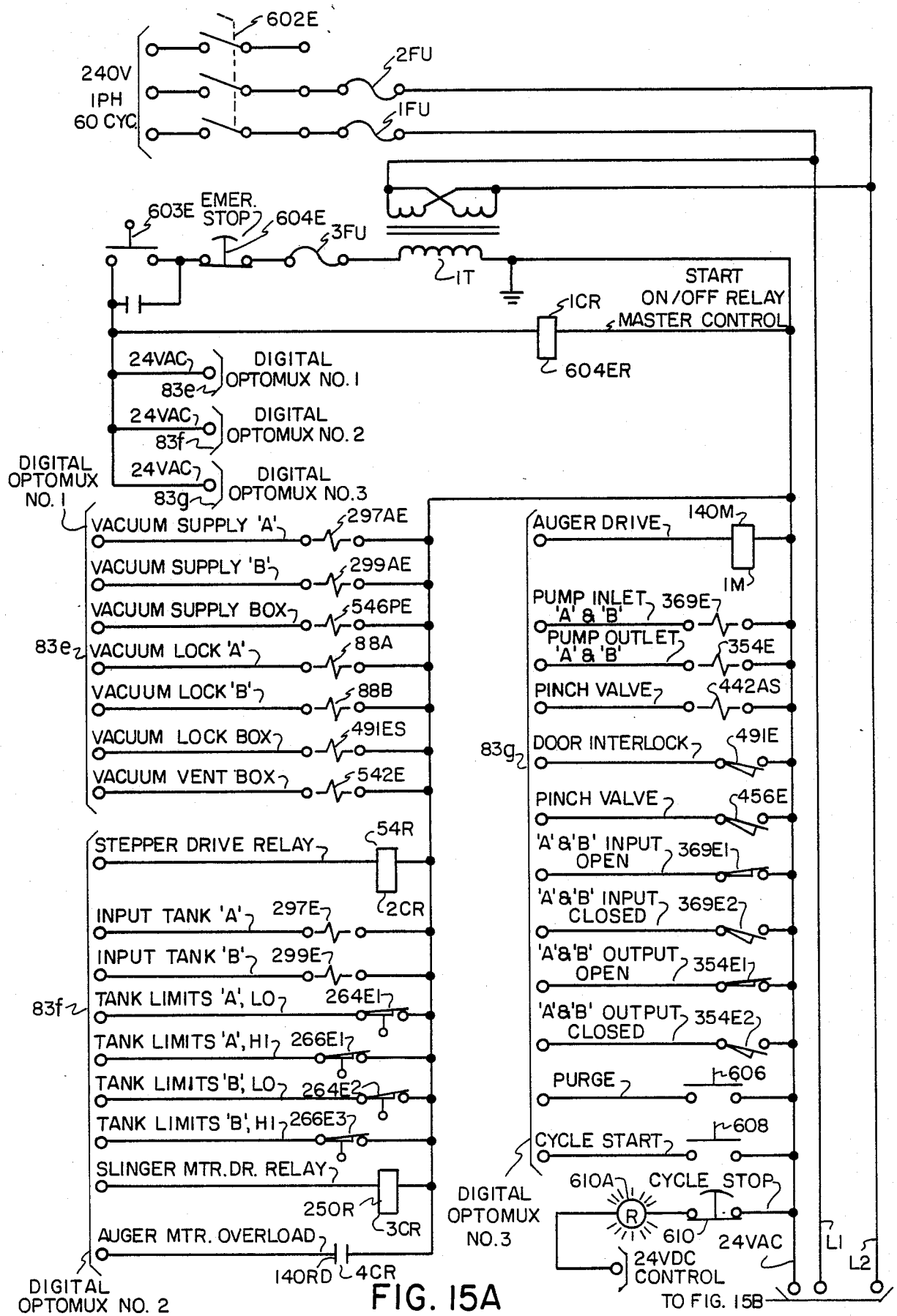
FIG. 15A is a semi-diagrammatic electrical schematic of electrical inter-connections of the apparatus of FIG. 1.
Figure 15B:
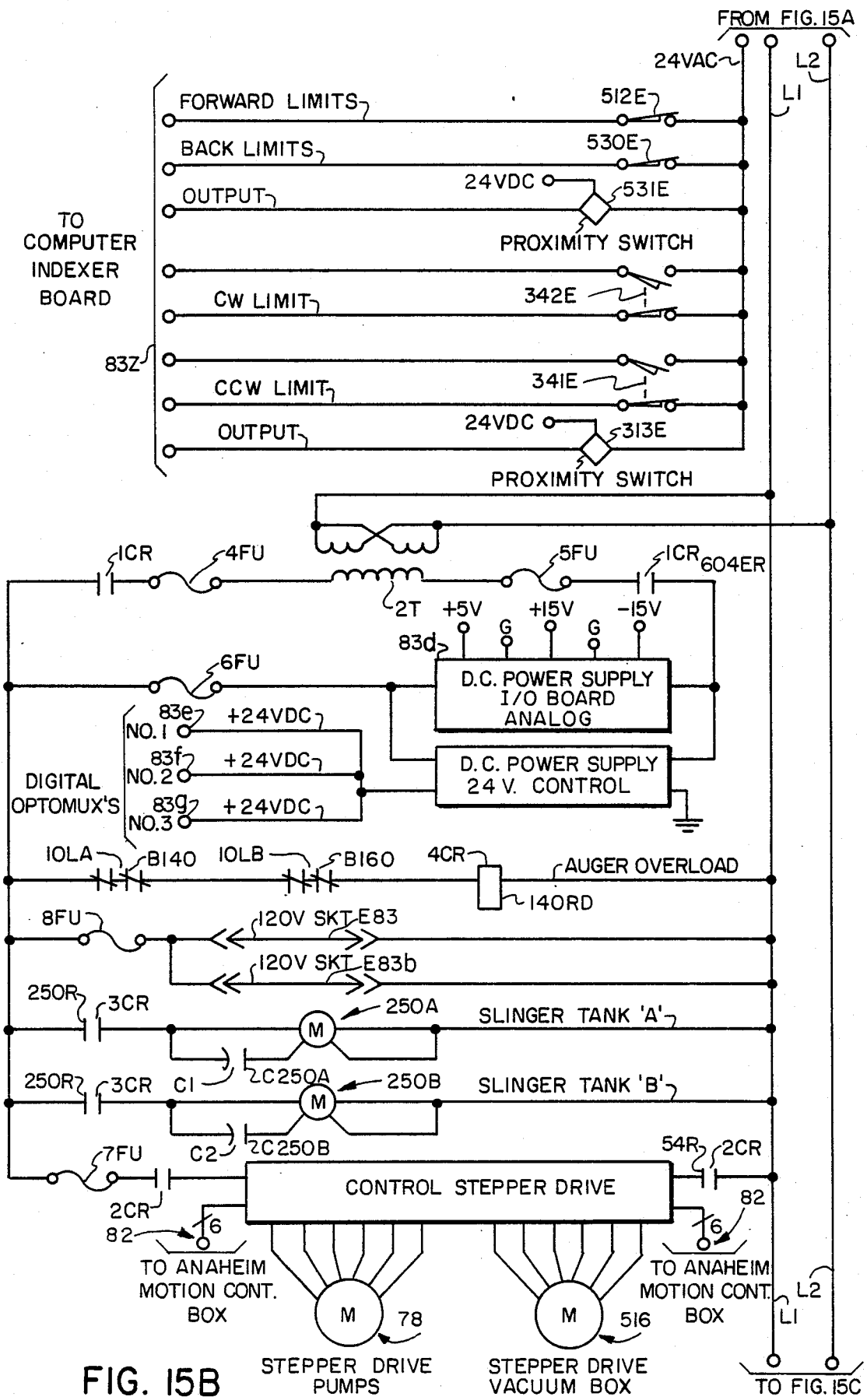
FIG. 15B is a continuation of FIG. 15A.
Figure 15C:
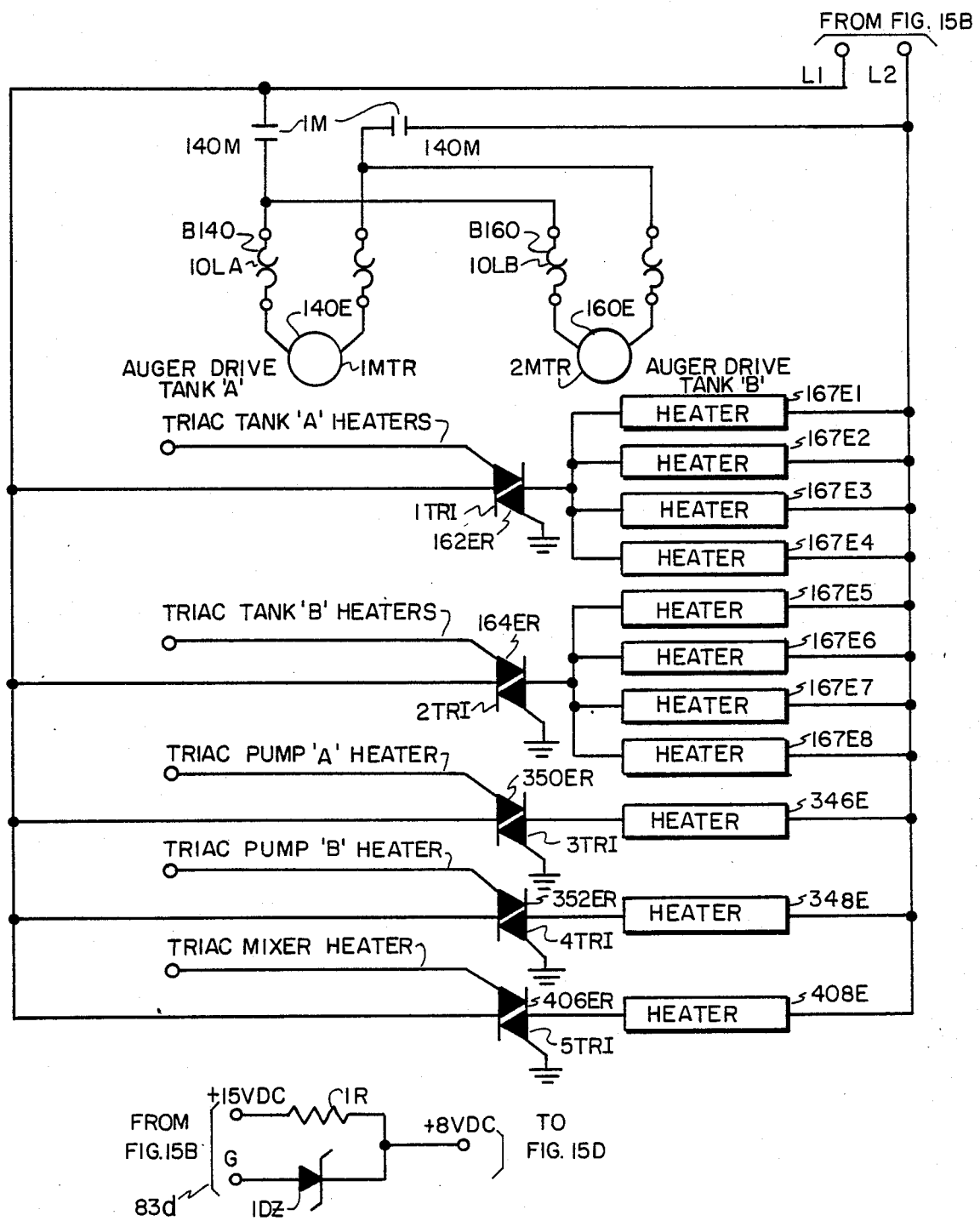
FIG. 15C is a further continuation of FIGS. 15A and 15B.
Figure 15D:
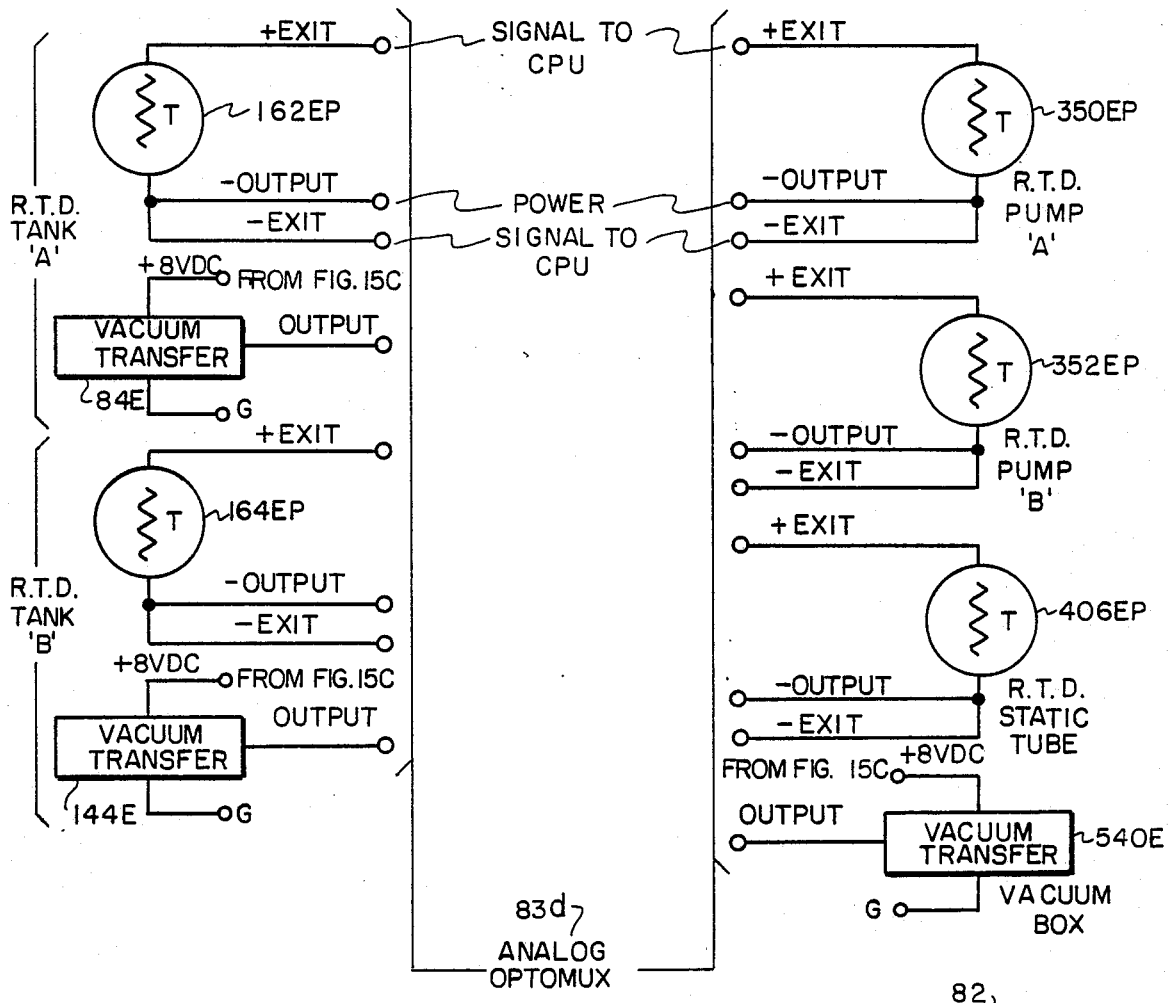
FIG. 15D is a further continuation of FIGS. 15A, 15B and 15C.
Figure 15D:
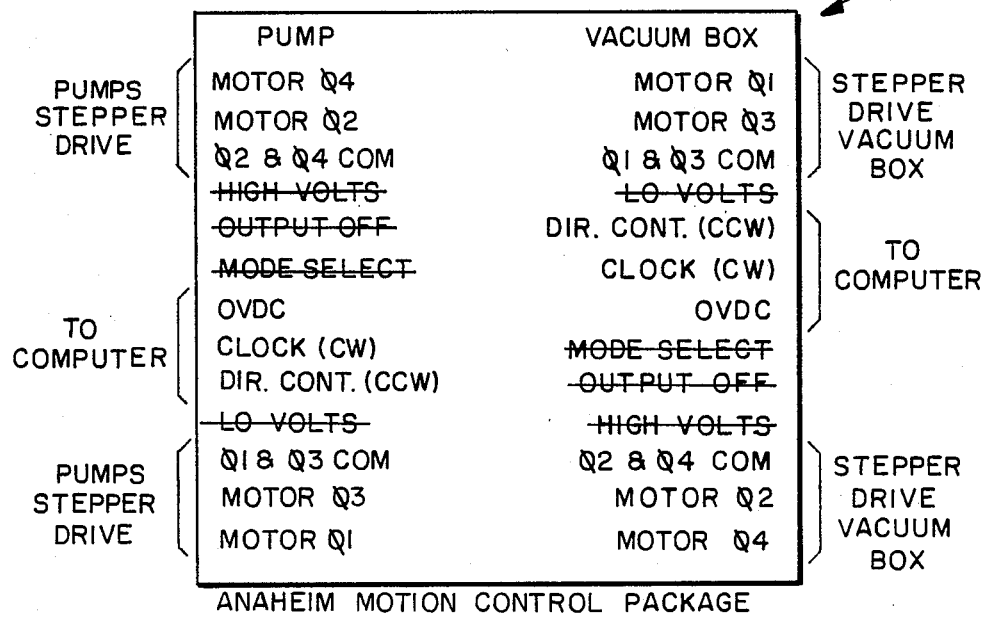
Figure 18:
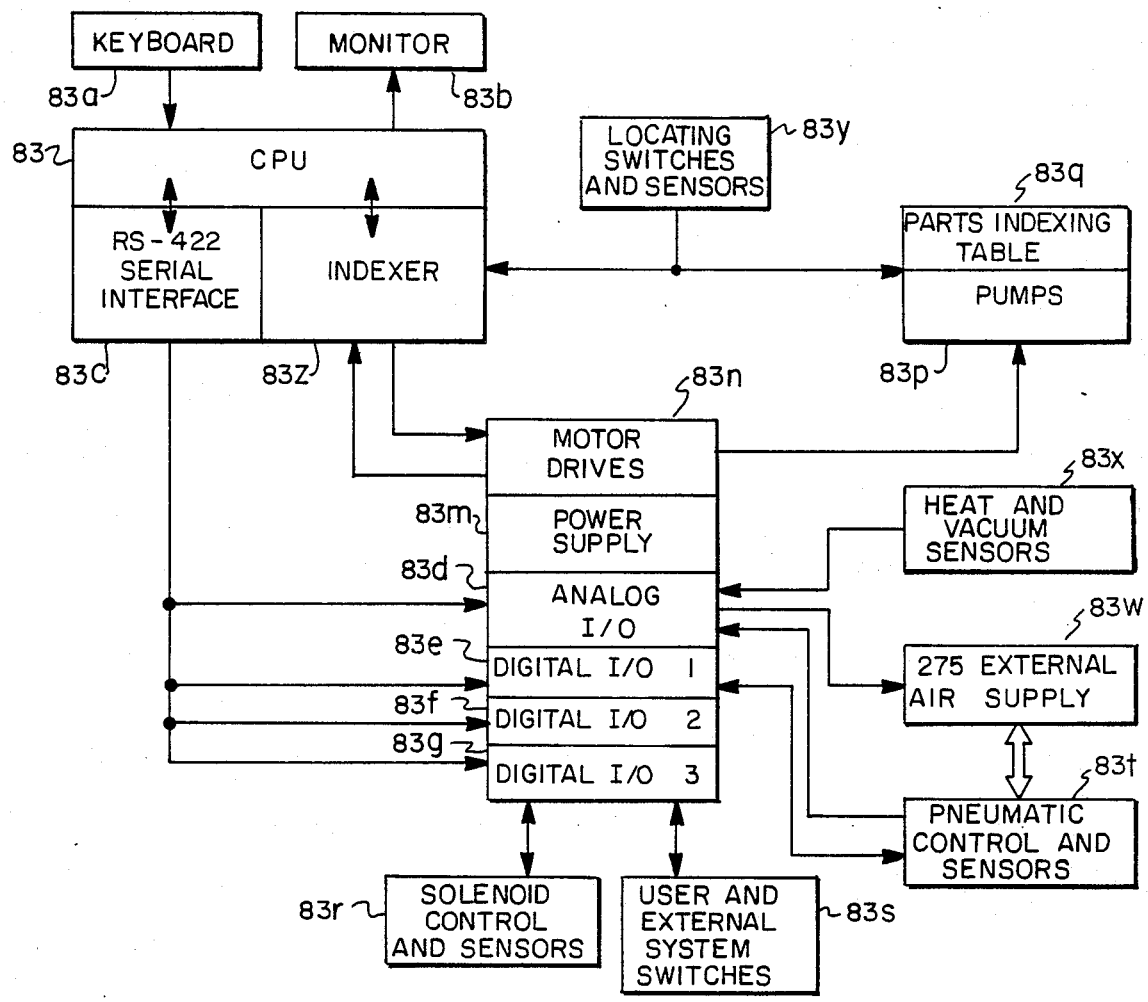
FIG. 18 is a semi-diagrammatic block diagram of the interactions of the main electronic components of the apparatus.

The rotary electric drive means 78 generally comprises motor drive means 80 (sometimes referred to as a DRIVER shown as 83z in FIG. 18) and control means for the motor driver 82 shown in FIG. 16A (sometimes referred to as an indexer and shown as 83Z in FIG. 18). The driver 83n accepts the digital step and direction inputs from the indexer 83z. Then, the internal drive logic and power amplifier set and maintain output current levels to the stepper motor. One such motor driver 83z found suitable is the BILEVEL STEP MOTOR DRIVER manufactured in California b ANAHEIM AUTOMATION, BLB Series. This driver will give very good power output and start-stop speeds without need for high wattage dropping resistors, operates on AC power and will operate four phase step motors. The wiring sites for the driver 83n are shown at the bottom of FIG. 15D and are quite self-explanatory by a review of the legends set forth and in view of the description of the components and operations herein. The wiring sites available, but not used in this particular apparatus are shown with a line therethrough. While it is believed that the abbreviations are self-evident to those skilled in the art, the following abbreviations are explicated: CW equals clockwise, CCW equals counterclockwise and OVDC equals output voltage direct current. The OVDC controls the "speed" and the "clock (CW)" and "DIR. CONT. (CCW)" controls the direction of the output of the stepper motors to provide forward and reverse to the motor outputs when they are converted to linear motion.

The driver may be used with a micro stepping indexer, such as that sold by COMPUMOTOR CORPORATION of Petaluma, Calif., Model PC 21. This indexer, in addition to being compatible with the aforementioned driver 83n, gives extremely good single axis motion control. It is a board level product which may be inserted into an open slot of an IBM AT, PC or XT expansion slot or I/O channel. (See FIG. 18 where it is shown semidiagrammatically with the reference No. 83Z.) It is also operative with most IBM PC, XT, etc. compatibles. It uses simple ASCII commands which determine all motor functions and can be programmed with high level languages such as TURBO PASCAL or BASIC. It is extremely useful in this apparatus and method because additional input and output lines, also controlled by the interface to the host CPU 83, such as an IBM PC, XT, etc., can be used for initiation and monitoring of other important system events associated with this apparatus, as will be clear from later discussion. See FIG. 18 where semi-diagrammatically it is shown that the indexer has locating switches and sensors 83y inputting signals for transference to the host CPU 83 thereafter outputting to control the stepper motor associated with the indexing table 83Q and pumps 83p. The computer CPU 83 is shown in the electrical schematic FIG. 15B at E83 with the monitor being shown at E83B.

Thus, from the programming of the computer 56 and its peripherals, a pulse stream generated by the indexer, will affect the driver so as to move the stepper motor to cause the piston means 48 to move to a precise position and stop. It can be programmed to move at constant velocity, alternatively move back and forth between two positions or any combinations of these moves. Also, complex sequences of movement, time delays, status report backs and other situation dependent events may be programmed through the IBM computer. The indexer under discussion thus functions as an intelligent peripheral, may be programmed to interrupt the host processor, has a memory which permits down loading of a multiple move sequence and easily supports a resolution of 25,000 steps/revolution (and higher) of the stepper motor. Because the pulse stream is under user control, very complex relative movement profiles of the first and second piston means 74–76 and first and second cylinder means 58–60 along any one stroke or sequences of strokes are available when two indexers, drivers and stepper motors (or servos) are used (see FIGS. 17A and 17B). The indexer operates with great accuracy in stepping with 0 tolerance from preset total, and quite good tolerance in velocity accuracy and repeatability (on the order of 1/50 of 1% of maximum rate). It may be noted that a servo motor using a feed back system using an encoder or resolver will give similar control to the indexer, driver, stepper motor, can be found commercially and is shown semi-diagrammatically in FIG. 17B, and may be substituted for the above described stepper motor system.

The source for operator input commands is a CPU 83 (see FIG. 18) which, after software is installed therein, is inputted by an operator via a keyboard 83a and is screen readable using a conventional monitor 83b. Since the IBM PC's, XT's, AT's and compatibles are widely distributed and used, it is preferred that they be used in the instant system because of operator and purchaser familiarity, reliability and ease of obtaining service. Obviously, other CPU's, monitors, keyboards and peripherals could be substituted with proper modifications and support.

The CPU 83 may have associated therewith another intelligent peripheral 83c in addition to the indexer 83z. This peripheral 83c may stand alone or be in the form of an internal controller card for coacting with an making inquiries with a large variety of system variables, both analog and digital. The peripheral 83c has associated therewith intelligent input/output (I/O) controllers (which may be analog or digital) which operate as slaves to the host computer CPU 83. The peripheral digital I/O sites are operative to control and status solenoids, valves, limit switches, contact closures, detectors and the like in this system, through a plurality of I/O boards 83e, 83f and 83g (see FIG. 18). The purpose of 3 digital I/O boards is for sufficient wiring sites or terminals and depending on needs for any particular systems, may be more or less. The system's temperature, pressure, air supply flow are sensed by sensors having a condition caused range of values measured by voltage change, to in turn be controlled through the analog I/O board 83d. Many combinations and configurations of I/O analog and serial points are provided for and signals will pass between the peripheral 83c over the same serial link to and from the host CPU 83. Also the digital I/O 83e, 83f and 83g and Analog I/O 83d boards coact with and may be used to control air supply pneumatic controls and receive signals from sensors.

One peripheral 83c found suitable for operation in this system is that manufactured by OPTO 22 of Huntington Beach, Calif. and sold under the trade name OPTOMUX as the RS 422 serial communication board, which will fit into any of a number of slots in the back of the CPU of an IBM PC/XT computer. The I/O boards 83d–g and their schematic circuitry and connections are shown in a more detailed form in FIGS. 15A–15D, to be later described.

The peripheral 83c is a bridge with several contact points with the system and apparatus 40. Software for the CPU 83 also controls the peripheral 83c and thereby various controls and events in programmable (and readable) fashion. It will be appreciated that the peripheral 83c has limited programming capacity and that for versatility, the architecture and memory of the CPU 83 is needed to handle the relatively large number of variables in the instant system.

A software program which will operate the instant apparatus 40 may be written in TURBO PASCAL language and is commercially available under the trade name OTTOMATION A-10 sold by Otto Engineering, Inc. of Carpentersville, Ill. This software, in broad brush, will programmably control through the CPU 83, the indexer 83z and the peripheral 83c, the entire operation of apparatus 40 while affording programmable changes in the operation.

Mounted on frame means 42 is a first chamber means 84 for degassing the work fluid (see FIGS. 1–4). When two work fluids are to be degassed and then later mixed, a second chamber means 144, which is substantially identical to the first chamber means 84 is employed. The first chamber means 84 has outlet means 85 adjacent the bottom thereof. As best shown in FIG. 16A, there is means 86 for delivering a first non-degassed work liquid (liquid A) from the storage tank to the vacuum tank A (first chamber means 84) for degassing. Broadly, under proper control, air pressure on work fluid A in the storage tank 276 may be used to force work material A into vacuum tank A 84 where it is slung against the sides of the tank and is degassed by the vacuum in the tank as it runs down the sides and/or is agitated in the tank. Appropriate means 88 shown diagrammatically in FIG. 16, is provided for creating and maintaining a vacuum including a vacuum pump and valving.

Figure 4:
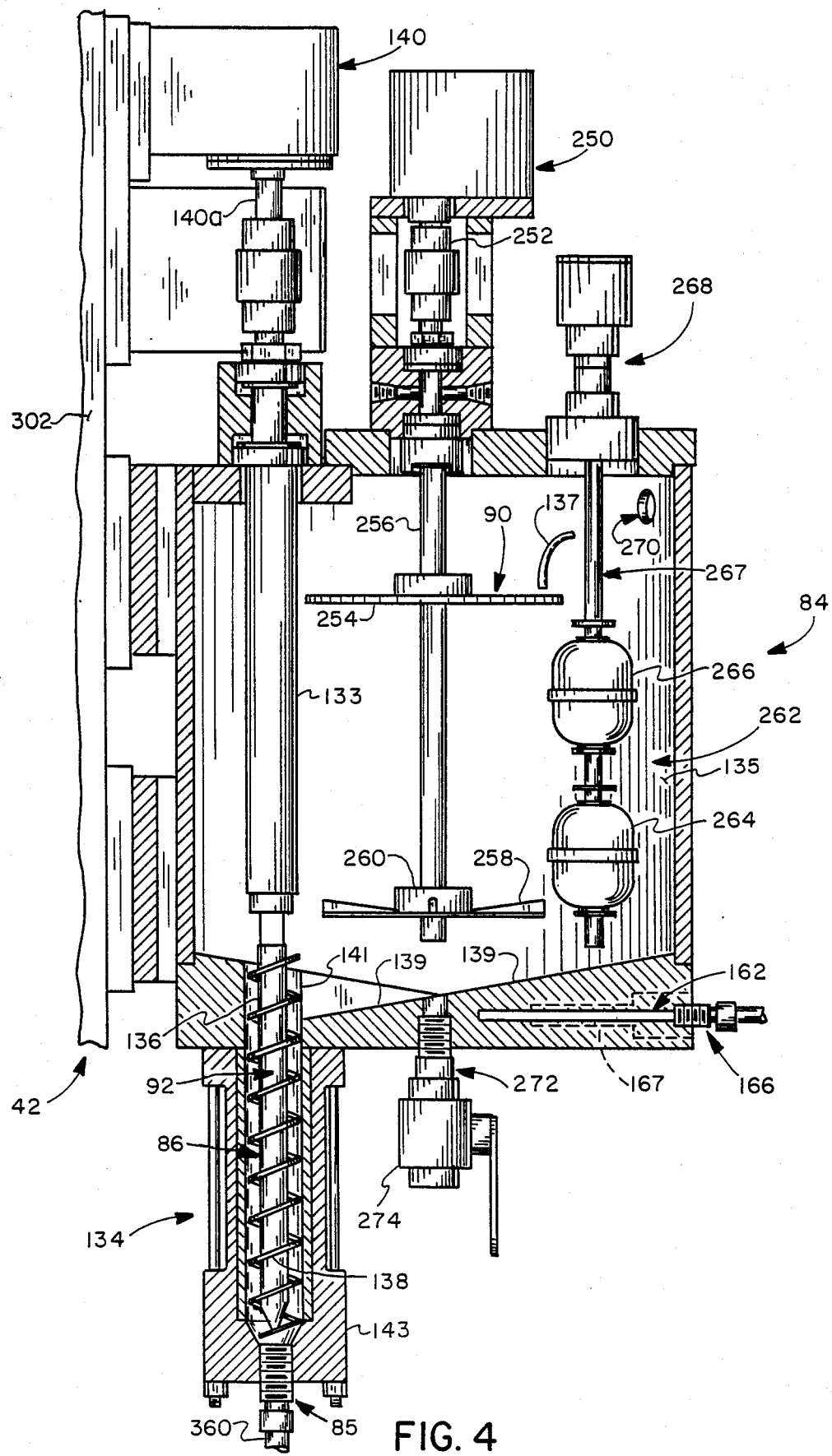
FIG. 4 is a partial vertical sectional view of a
m tank and positive pressure auger pump along lines 4—4 of FIG. 3.

Also, as shown in FIG. 4, a first means for agitating the work liquid 90 has a rotating top "slinger portion" and bottom "agitator portion". Positive removal means 92 for the chamber means 84 causes the work liquid A to exit the outlet means 85 under positive pressure at all times. It will be appreciated that a variety of constant positive pressure evacuation means could be used, but the auger mechanism shown here works well.

It is important to note that downstream of the chamber outlet means 85, there are substantially sealed passageways 94 (see FIG. 16A) that extend all the way to the dispensing outlet means 72 (see FIG. 16B). However, since there are valves, precision positive displacement pumping apparatus, means for mixing of the work liquids, and routing to dispensing outlets in the substantially sealed passageways 94, there are many joints and individual seals employed, including seals employed in connection with moving parts. Each of these seals and joints pose a potential point for breakdown and reentrainment of unwanted gas. Thus, the maintenance of positive pressure on the work fluid (above atmospheric) by the action of the removal means 92 upon the work fluid in the system downstream of the outlet means 85 maintains the work fluid in the system in desired degassed state.

The dispensing outlet means 72 is located in the dispensing chamber means 100, here shown as a top opening vacuum chamber for ingress and egress of a batch of work pieces on a tray holder. Suitable valving, vacuum pump source means and venting means, together with sensing means all under the control of the computer and its peripherals become the programmable control means 102 for the vacuum dispensing chamber means 100. It will be appreciated that in some operations, a substantially continuous automatic indexing and work piece mover may be used rather than the batch system shown, but at greatly increased cost.

As shown semidiagrammatically in FIG. 16B, the sealed passageway means 94, downstream of the mixer manifold, are adapted for coaction with movable pinch valve means 104, the passageway means 94 being a plurality of flexible sealed passageways 106 (hoses) which are individually controlled by pinching means 108 coacting with anvil means 109. The movement of the pinching means 108 is controlled by the computer in timed relationship to positioning of the work pieces by computer controlled means 110 for programmably moving the work pieces located in chamber 100.

It will be noted that the apparatus 40 dispensing outlet means 72 features multiple dispensing orifices 112 in the dispensing chamber 100. There is simultaneous dispensing into a spaced array of columns of work pieces, and then the columns of work pieces are indexed under the fixed dispensing heads. In short, the dispensing heads are fixed and the work pieces are moved. It will be appreciated that the reverse is fully contemplated (as later discussed) and the dispensing head may be moved in X-Y-Z planes over fixedly located and/or moving work pieces. However, where large production runs of identical parts over long periods are contemplated, the use of a movable work table means 114 is cost effective in combination with multi-dispensing outlet means 112.

The work table means 114 and the piston means 48 of the reciprocating material pumps are both precisely controlled in similar fashion with the computer and its peripherals, indexers, drivers, rotary stepper motors operating through precision ball screw means 120. High precision dispensing demands not only precise control of the relative movement of the work fluid to be dispensed to the work piece (for volume control) but equally high "positioning" control of the work piece relative to the dispensing head for location control. When any automation is used to cause relative movement of the work piece to the dispensing outlet, such movement is particularly adapted for control by the same type of electrical/electronic/mechanical mechanism discussed above relative to movement of the piston means 48. (The computer, computer peripherals, the indexer, the driver, the stepper motor, and means for taking the output of the various sensing elements, correlating everything and causing movement.)

The foregoing is a rather broad discussion of the major components of the apparatus and system. A more detailed discussion of the apparatus and its operation is now set forth.

The precision pump means 44 is shown in detail in FIG. 5, it being appreciated that each of the two pumps shown in FIG. 16 is substantially identical. As shown in the sectional view portion of the FIG. 5, the pump means is preferably formed with solvent bearing means 122 in the cylinder means 46 adjacent to the retracted position of the reciprocating piston means 48. It will be seen that O ring seals 122a and 122b define an annular chamber which communicates with inlet 122c. A bottle of solvent (not shown) may be attached to inlet 122c so that solvent is admitted to the area between O rings 122a-b.

The exterior radial surface 124 of the piston means is deliberately made with a diameter dimension several thousandths of an inch smaller than the diameter of the cylinder surface 132. When valve operator means 130 (bottom center of FIG. 5) cause the closing off of inlet 126, and piston means 48 is advanced into the cylinder, the work fluid is forced past the end 131 of the piston means and along the surfaces 124 and 132 for exiting through outlet 128.

Several advantages accrue to this pump structure. The work material (such as materials A and B) being pumped is never trapped in the cylinder for build up on surfaces 124, 131 and 132 over time, i.e. the mechanism is self-scouring and self-cleaning because of turbulent flow past the end surface and along the spaced walls 124–132 being created. This self-cleaning and flushing is aided by the piston end surface being located immediately adjacent the outlet 128 at the full retraction position so that old work material is constantly flushed out during movement therefrom on the forward reciprocating movement. Also, the side walls of the piston 124 are bathed in solvent in solvent bearing 122 on every stroke due to the geometry employed. With this mechanism, positive pumping displacement is independent of material viscosity and source pressure. Measuring is done on a volumetric displacement basis with high accuracy. Work materials such as A and B, are thus moved through the pumps, through the mixer means 70 for accurate volumetric dispensing at the dispensing outlet means 72. It will be noted that thousands of discrete shots may be made on a single stroke or a single dispensing shot on a single stroke may be made.

It will be apparent that the pumps must have inlet valves (356 and 358 in FIG. 16A) and outlet valves (368-370 in FIG. 16B) operatively associated therewith. The inlet valves must be closed when the pump is dispensing and open when filling, while the reverse is required for the outlet valves. Suitable valve operators are provided for the inlet and outlet valves which will be operated under control of the computer 83 as will be discussed.

The frame means 42 mounts two spaced upright members 300-302 which in turn mounts plate 304. Plate 304 mounts the pump means 44 on the rear as viewed in FIGS. 1-3 with the first and second cylinder means 58-60 each being fixed to plate 304. The first and second pump piston means 74-76 are mounted so that portions thereof move into and out of the respective cylinder means (to cause end surface 131 to move between the retracted position shown in FIG. 5 and an extended position) and they ar movable respective to plate 304 (see FIG. 5). A movable bar or drive plate 306 is fixed at each of its horizontally outboard ends 308-310 to the exterior mid portions 312-314 of the first and second piston means to tie them together for simultaneous movement. A proximity switch 313 and probe 315 are used to indicate home position of the pump pistons. It will be appreciated that use of the proximity switch probe 315 will trigger a signal which indicates position of movable plate 306 on which it is mounted which in turn gives the positions of the pump pistons relative to their respective cylinders. Proximity switch 313 is shown as 313E in electrical schematic FIG. 15B and is similar to later described proximity switch 531. Switch 313 is mounted on a suitable bracket means 311 which is fixed to plate 304. Suitable bearing blocks 316-318 are mounted on plate 304 and support the respective outboard reduced sized end portions 320-322 of the first and second piston means 74-76 for precision movement therewithin.

Drive plate 306 is driven by the precision screw/ball means arrangement 120, one portion being attached to the center of plate 306 as shown generally by the reference numeral 324. The precision of the translation of the rotary motion of the motor drive means 80 to rectilinear movement of the piston is critical for high precision. Generally, the higher the cost of the ball/screw means the higher the precision. In general, the degree of precision is determined by the particular application, and with precision ground screws, precision balls, and preloading, high precision is obtainable. For intermediate precision, a ball screw mechanism found suitable both for moving the plate 306 and for the work table means 114 in the dispensing chamber is Model R-505 manufactured by a division of Warner Electric Brake Company of South Beloit, Ill. It will also be appreciated that translation of the rotary movement of the stepper motor may include a gear motor means 326 interposed between it and the ball/screw means 120.

As shown near the top of FIG. 5, the output end 328 of the rotary electric motor means 78 is suitably connected to the input end 330 of gear motor 326 through suitable coupling 332. Depending on application, a suitable gear motor may provide a reduction of the rotary output and power to drive the apparatus at any reasonably desired preselected ratio. One such gear motor found acceptable for this system is that manufactured by Bodine Electric Co. located in Chicago, Ill., selected for the reduction and power desired in the application under consideration. The output end 334 of the gear motor is attached to the precision ball/screw means 120 through a spring coupling 336 for causing the precision screw 338 and ball bearing 340 to move relative to each other and drive plate 306.

A limit switch 342 is mounted adjacent the top of pump means 44 on the exterior of cylinder means 46 for engagement by a portion 344 of the underside of drive plate 306. When plate 306 has advanced beyond completion of the stroke, portion 344 will signal such position and give overtravel protection. Another limit switch 341 may be mounted on bearing block 318 for overtravel protection on the retraction movement of the piston means 74-76, and is engagable by the top side of plate 306 as shown in FIG. 5. Each of the limit switches 341, 342 are shown in electrical schematic in FIG. 15B as 341E and 342E. As schematically shown, each of the switches 341 and 342 are double throw switches (see FIG. 15B) operating on the 24 volt circuit.

Each of the first and second cylinder means 58-60 are assembled with respective electrical band heaters 346-348. The heaters are also shown semi-diagrammatically at 346E and 348E in the electrical schematic drawing FIG. 15C. They are operable to cause heat input to the cylinder blocks when the temperature probe sensing elements 350–352 detect the absence of heat and so inform the computer through appropriate circuitry. The probe sensing elements are shown semi-diagrammatically at 350EP and 352EP in schematic FIG. 15D. The probes 350EP and 352EP are low voltage probes, each of which receive DC low voltage power from the transformer 2T at the rectified power supplied to the DC analog board 83d as shown in the electrical schematic of FIG. 15B. It will be appreciated that the probes will, when the programmed software later described calls for it, trigger suitable relays 350ER and 352ER to cause the high voltage heaters (240 V) to activate as shown in FIG. 15C.

The movable valve means 130 located below the first and second cylinder means as shown in FIG. 5, comprises a valve operator means 354 (354E in Schematic FIG. 15A) which may be a solenoid type under the control of the CPU 83. The operator means 354 is, when actuated, operable to control a separate air operated inlet ball valve means 356–358 for each cylinder. (See air schematic FIG. 14.) The inlet ball valve means 356 controls inlet pipe passageway 360 and inlet ball valve means 358 controls inlet pipe 362 which respectively connect to the outlets of tanks A and B as shown in FIG. 16A.

As shown in section in FIG. 4, the degassing chamber 84 contains a rotary auger mean 134 adjacent the outlet means 85 for delivery of substantially degassed work fluid "A" to passageway 360. The chamber means 84 broadly comprises a cylindrical "A" work material vacuum tank 135 having an inlet 137 for the work material. An auger rotary electric motor means 140 external to tank 135 has an output shaft 140a for sealing extension through tank 135 to drive the elongated shaft 133 of auger means 134 adjacent the bottom of the tank 135. A special pressurized seal (not shown except in schematic FIG. 14) is provided for the auger motor shaft and for the slinger motor shaft, as will be discussed, to assure lubrication. This, as is known in the art, is preferable type of seal because of the vacuum on one side of the rotary seals.

It will be seen that the tank 135 interior slopes at the bottom 139 so as to gravitationally lead work material to the upper end 141 of the walls defining the auger chamber sleeve so as to automatically feed work material thereto. The auger thus has an interior of the tank portion 136 open to the work material. The auger extends into extension 143 at its lower portion 138. The auger means 134 is so arranged and constructed together with its sleeve housing, so as to rotate in only an output direction so as to put and maintain a positive pressure on the work material when the auger is rotated by the auger motor means 140. Thus the material, under gravity flow will be led to the inlet 141 of the auger chamber and then positively exited through exit outlet means 85 with above atmospheric pressure. The auger motor means 140, as is apparent, is under control of the computer CPU 83, has various and usual protections such as the circuit breaker B140 and sensors and controls. The auger motor means for tank A is shown semi-diagrammatically as 140E and as 160E for tank B in electrical schematic FIG. 15C. As shown they may be powered by the 240 V circuit. Low voltage control of overload (24 V) is provided by a suitable relay 140RO on I/O board 83f and the motor drive is controlled through suitable control 140M on I/O board 83g.

As shown semi-diagrammatically in FIG. 16A, the second chamber means 144 has an outlet 146 which is controlled by a second positive removal means 154 comprising a rotary auger means 160 similar to auger means 134 for causing and maintaining above atmospheric exiting pressure upon work liquid B. It has appropriate controls and devices similar to motor 140. This causes work liquid B to be delivered through pipe passageway 362 to the second cylinder means 60 for actuation through to the mixing means 70 upon the movement of drive plate 306. The essential concept is to maintain (during operation) a positive pressure with the two auger means 134, 160 on the work liquids downstream of the outlets of vacuum tanks A and B so that entrainment of gas (air) into the work liquids is prevented.

The tank 135 may have heater means 166 in the form of a plurality of cartridge heater elements 167 in the bottom wall (shown in dotted line in FIG. 4). Only one heater element 167 is shown in dotted outline form in the drawings. Preferably however, there are four heater elements for each tank to evenly distribute heat to the work material contents. They are shown in the electrical diagram FIG. 15C as elements 167E1–167E4 for tank A and 167E5–167E8 for tank B. First temperature sensing means 162 (probe) is also located in the bottom of tank 135 for control of the heater elements 167E1–167E4. A similar second temperature sensing means 164 is provided for the second chamber means 144 to sense temperature in tank chamber 144 for work liquid B to control similar second heater means 168 having elements 167E5–167E8 (see FIG. 16A). The probes are shown semi-diagrammatically in FIG. 15D as 162EP and 164EP. Suitable probes for this function are those manufactured by OMEGA ENGINEERING, INC. of Stanford, Conn. which are operable to give a variable output voltage which is temperature dependent. These voltages are brought to the analog I/O board 83d by suitable wiring. It is shown in FIGS. 15D, 15C and 15B that the direct current input for the probes is supplied by the DC rectified power supply board (see FIG. 15B). The DC power supply (as shown) is a rectified supply and gives off 15 VDC positive which is brought down to 8 VDC (see bottom of FIG. 15C) to supply the sensitizing power to the probes at 8 volts DC (see FIG. 15D). It will be appreciated that the heaters 16 are preferably operated on the high (240 V) circuit as shown and thus the probes 162EP and 164EP trigger on/off through relays 162ER and 164ER when programmed by the software in CPU 83.

A second motor means 250 is centrally located on tank 135 and has an output shaft means 252 sealingly extending through the top of the tank. The motor 250 is shown in electrical schematic in FIG. 15B as 250A for tank A and 250B for tank B. The motors may be high voltage motors or transformed (at 2T) line which are controlled by low voltage relays 250R (see FIG. 15A) connected to I/O board 83f. Suitable starting capacitors C250A and C250B are provided as shown. A slinger plate 254 is mounted on extension shaft 256 near the top of the tank 135 to receive work liquid from inlet 137 to sling the work material as shown in FIG. 16A. An agitator plate 258 is mounted on shaft 252 near the bottom end portion 260. High low liquid level sensing means 262 having floats 264 for low level and 266 for high level sensing are located interiorly of tank 135. The floats 264–266 are operable to actuate switches interiorly thereof. The high low sensing means 262 has an extension means 267 sealingly upwardly extending through the tank top for actuating a connection mean control 268 which is connected through suitable wiring to the computer CPU 83. The floats 264–266 may be of any suitable construction which give an electrical signal upon attainment of a predetermined liquid level. They are shown in the electrical schematic FIG. 15A as 264E1 and 266E1 for tank A and 264E2 and 266E2 for tank B. They are associated with I/O board 83e as shown and are on the 24 volt circuit which is transformed from the 240 volt circuit by transformer 1T shown at the top of FIG. 16A. As seen, the floats 262 and 264 are responsive to the work liquid level which in turn controls the supply tank feed to inlet means 137 to the vacuum tanks.

As viewed in FIG. 16 in semi-diagrammatic form the tank 135 has a vacuum impressed thereon through the use of means 88 which includes (later described) vacuum valving, vacuum pump and a suitable vacuum passageway means 270 (see FIG. 4) from the tank. It will be understood that the vacuum pumps and valving while being air powered are also configured and arranged for control by the computer and analog I/O board 83d and digital board 83e through the electrical controls as will be discussed in connection with the electrical schematics of FIGS. 15A–E. The tank 135 may be formed with clean out exit means 272 and associated valve means 274 as shown at the bottom of FIG. 4.

Figure 14:
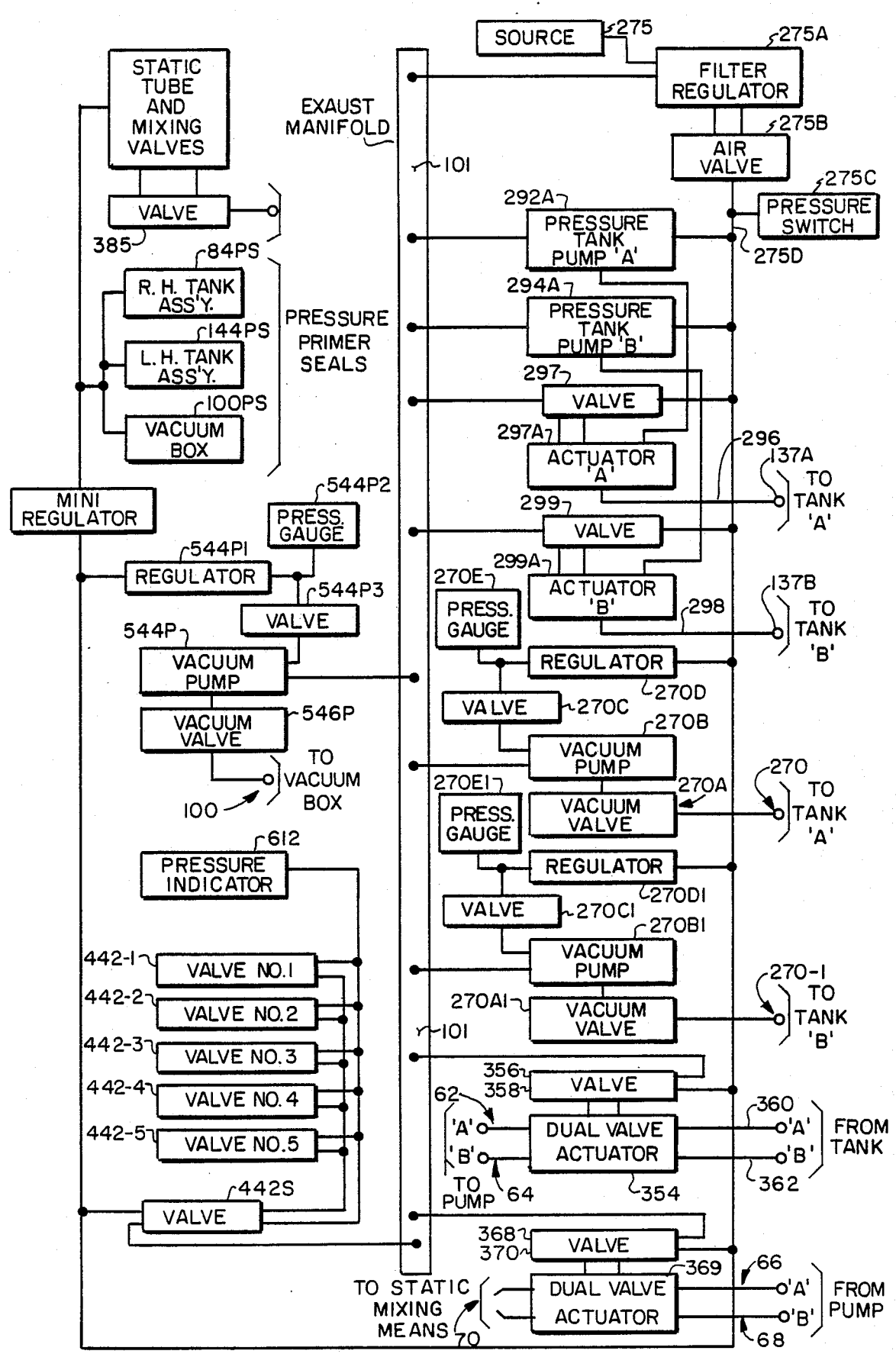
FIG. 14 is a semi-diagrammatic schematic diagram of the air circuit interconnections of the apparatus.

The vacuum valve passageway means 270 for tank A is shown semi-diagrammatically in FIG. 14; there being similar means for tank B. It will be appreciated that there will be suitable sealed pipeing and fittings extending interiorly of the tanks A and B and exterior thereof will be a vacuum valve 270A, air operated vacuum pump means 270B having a valve 270C, pressure gauge 270E and regulator 270D attached to the air source 275 through a suitable filter regulator 275A, air valve 275B, pressure switch 275C and suitable air lines 275D. Also as shown, tank B has similar mechanisms 270A1, 270B1, 270C1, 270D1 and 270E1 for the passage inlet means for tank B which are attached to air source 275 as shown in FIG. 14. The vacuum pump means 270B and 270B1 may be of the type 544P set forth hereinafter. The pressure switch 270C will be later described.

At the lower rear of the apparatus 40 are the pressure storage tanks 276–278 for the respective A and B work liquids (see FIG. 3 and flow diagram 16A). Each tank is preferably fitted with motor means 280–282 having motor output extensions 281–283 terminating in agitator extensions 284 and 286 to rotate and stir the respective contents. Air pressure from a central source 275 puts positive pressure into each tank 276–278 through outlets 288–290 to force the respective liquids through outlets 292–294 and passageways 296–298. Valve means 297–299 are disposed in passageways 296–298 and are operated in response to the high low sensing means 262. Again as will be discussed, valves 297–299 are under the ultimate control of the computer and as shown in FIG. 14, the actuators 297A and 299A are solenoid actuators for these valves which will be responsive to electrical signals. They are shown schematically in FIG. 15A as 297AE and 299AE. Thus, where the sensing mechanism (the high low floats 264–266 and their associated switches) calls for more work liquid and provides a signal to the computer through the I/O board, the actuators 297A and 299A will be actuated. It will be appreciated that vacuum sensing means in the form of pressure transducers 84EP and 144EP ar associated with each of the vacuum chamber tanks 84 and 144 respectively and are shown in FIG. 15D. They interconnect with other electrical components through the analog I/O board 83d on low voltage rectified current (8 VDC) as shown in FIGS. 15C and 15D.

Referring to FIGS. 16A–B and FIGS. 7–13, as the pumped work materials exit the first and second outlet 66–68 from the pumps, they enter sealed pipe passageways 364–366. The flow of work materials A and B are controlled by air powered ball type outlet valves 368–370 (see FIG. 14). Each of the outlet valves 368–370 is controlled by a solenoid valve 369 (369E in FIG. 15A) which is under ultimate control of the CPU 83 as shall be described. The valve operator 369 and the controls are so configured and arranged that they cause outlet ball valves 368–370 to be closed when inlet valves 356–358 to the pumps are open and outlet valve to be open when the inlet valves 356–358 are closed. The inlet valves 356–358 are under control of computer controlled solenoid valve 354 shown a 354E in schematic FIG. 15A. The I/O board 83g also receives signals from switches 354E1 and 354E2 associated with solenoid outlet operator 369E with similar switches being provided for inlet operator solenoid 369E having reference numbers 369E1 and 369E2 as shown in FIG. 15A. Through these switches and the circuits shown, the operation of valve 354 is coordinated with solenoid valve 369.

The valve operator 369 controls movement of the pumped work materials through outlet passageways 372–374 going downstream toward the mixing means 70 through continuation passageways 376–378.

A solvent bypass system 380 is provided for cleaning/purging the mixing means 70, dispensing manifold means 71 and dispensing outlet means 72. The solvent bypass system 380 comprises a solvent tank 382 containing solvent 384, which is pressurized by air pressure source 275 through inlet 386 for flow from tank 382. A three-way valve means 385 is operable to be in off, air purge only or solvent purge positions. The valve means 385 is shown semi-diagrammatically in FIG. 14 in the upper left corner. When in the solvent purge position, the air pressure is operative to force solvent 384 through pipe 388 to branches 390–392 through solvent bypass valves 394–396. The solvent then will pass through the mixing means 70, dispensing manifold means 71, and dispensing outlet means 72. Means to capture the expended solvent (not shown) is used adjacent each of the respective multi-dispensing head orifices 112 when cleaning the apparatus.

After passing through the bypass valves 394–396, the two work materials enter the mixing means 70. The mixing means 70 comprises a mixing body 398 having inlets 400–402 for work materials A and B and outlet 404 for the exiting of the mixed material AB. The means 70 also includes a temperature sensing probe 406 and a heater cartridge 408 for maintaining the proper temperature of the materials. The heater probe and cartridge are also shown at 406EP and 408E in FIGS. 15C and D, there being relay means 406ER in the circuit since the heater 408E is also on the high voltage circuit and the probe is a part of a low voltage circuit as shown. The mixing means 70 can be of any one of a number of suitable designs depending on work materials involved. Here a static mixer is used which is commercially available as Model 1045 manufactured by TAH INDUSTRIES of Imlaystown, N.J.

Figures 8, 9:
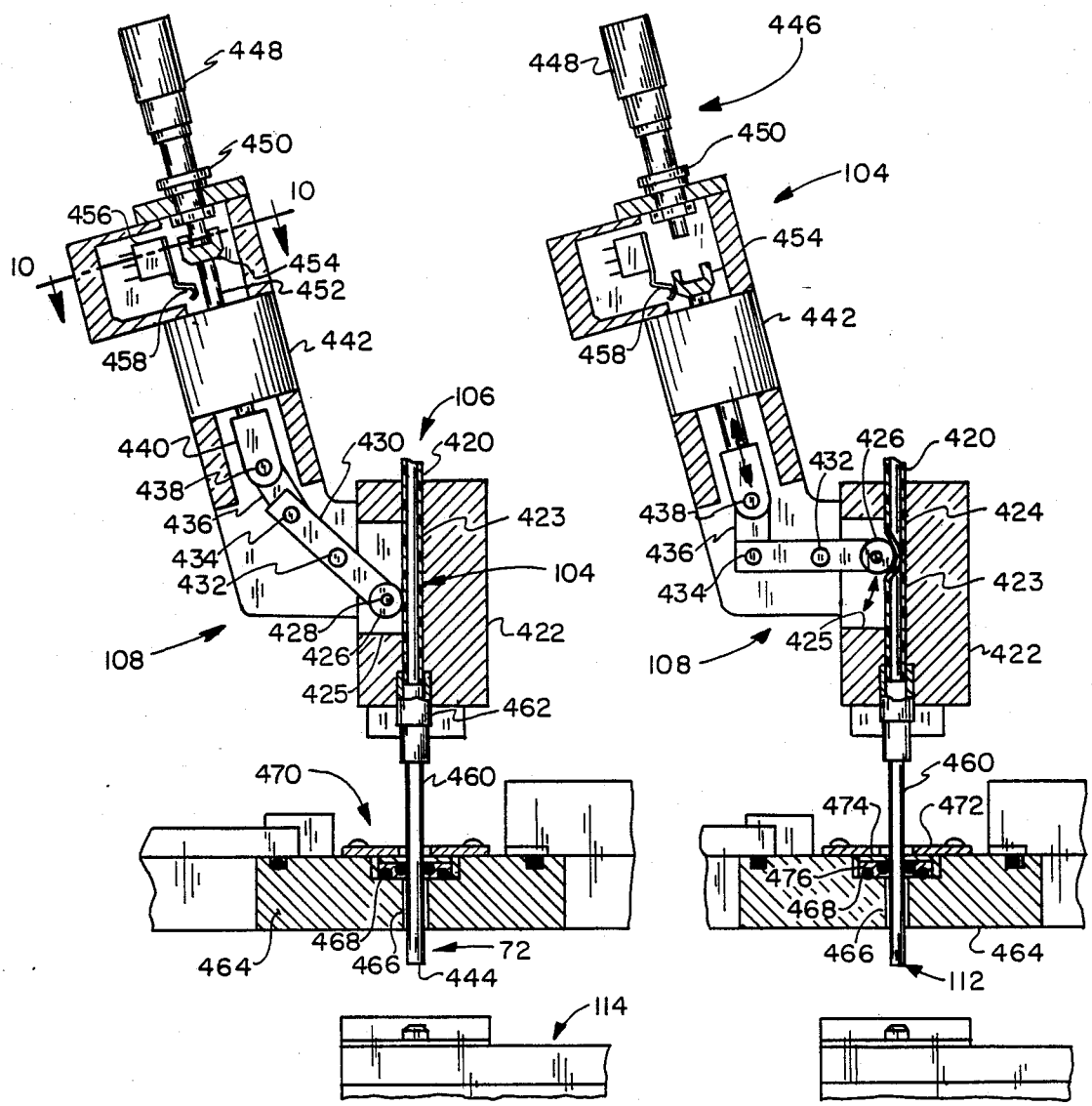
FIG. 8 is a partial sectional view along lines 8—8 of FIG. 7 showing one of the pinch valves in open position.
FIG. 9 is a partial sectional view similar to FIG. 8 with the valve in closed position.
Figure 10:
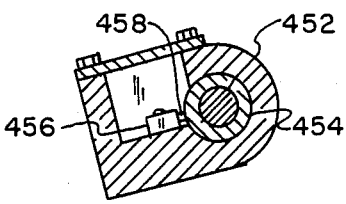
FIG. 10 is sectional view along lines 10—10 of FIG. 8.

Turning now to FIGS. 16B and 6–10, the outlet 404 of the mixing means 70 leads to a dispensing manifold means 71 through a sealed passageway 410. A manifold block 412 has a central chamber 414 with a plurality of exit apertures 416, there being one such aperture for each of the multiple dispensing outlet means 112 (there being 5 in the instant apparatus). Outlet tubes 418, one for each aperture 416, are fixed to block 412 for attachment of flexible hoses 420 which are thus in communication with chamber 414 through exit apertures 416. This portion of the apparatus serves as a distribution dispensing manifold of the mixed work materials AB (see bottom of FIG. 16B). The flexible hoses 420 are fed through suitable apertures 424 in fixedly mounted control block 422. As best seen in FIGS. 8 and 9, a plurality of large apertures 425 are found in block 422, there being one aperture 425 located adjacent each tube 420 for access of plurality of individual pinching means 108, each having a roller 426 for flow control shut off of each tube 420.

Each pinch roller 426 rolls on its pivot 428 and is located on the end of a link 430 which pivots on axis pin 432. The other end of link 430 each mounts a pivot pin 436 which pivotally accepts the end of pistons 440 of each of the air actuated cylinders 442. The cylinders 442 ar shown in air schematic FIG. 14 as 442-1 through 442-5 which are under the control of a solenoid valve 442S shown in FIG. 14. The valve 442S is shown in the electrical circuit as 442AS associated with I/O board 83g in the 24 volt line in FIG. 15A which is under the control of CPU 83.

It will be observed that when each of the air cylinders 442 actuates their respective links 430 and 436, the roller 426 is moved downwardly to the dispensal (open) position as viewed in FIG. 8, the at rest position (off) being shown in FIG. 9. The individual cylinders 442-1 through 442-2 are air pressure operated for the motive power but are in turn controlled by the solenoid 442AS which is electrically integrated into relationships with the other components, controlled and powered by the programmable control of the CPU83.

The movement of the pinching means 108 from the open position of FIG. 8 to the off position of FIG. 9 causes rolling/pinching of the flexible tubes 420 against the back side 423 of the openings 425 which thereby become anvils 423 for the respective adjacent tubes. The rolling progressive pinching of the tube 420 causes the precision closure (shut off) of work material AB. It will also be noted that it is preferred the roller/anvil pinching action occurs physically quite close to the outlet end 444 of the tube in the chamber 100. The path of roller 426 is such that a rolling action continues upstream beyond pinch off point to create an immediate back pressure "suck back" by slightly ballooning the flexible tube with work material and creating a suck back vacuum adjacent the roller.

The outlets 444 during its shut off periods when work pieces are being moved to present fresh ones for receiving dispensed materials AB, are subject to the reduced pressure situation (below atmospheric) in vacuum chamber 100, and over time the pressure in the tube 420 between the end 444 and the pinch off place at anvil 423 will equalize with the reduced pressure in chamber 100. To prevent drip, the geometry of the tubes 420 and the surface tension and adhesion characteristics of the mixture AB must take over (from the back pressure) and cause the mixed fluids to be retained within the tube 420 against the gravitational effects of the fluids in the tube when the pressure in this area equalizes.

In some applications, it is possible to have suck back and non drip or ooze of work material after shut off by the slight reverse movement of a piston means 48 relative to the cylinder means 46. This is particularly possible in non-vacuum dispensing and in those applications where the dispensing is of a single material and there is no mixing required. Because the relative movements of the piston to the cylinder are so precisely controlled by the techniques and the mechanisms described above, and are so quickly modified by the operator through inputting changes using the software program, it is possible to adjust the relative position therebetween by reversing to meet changes in work materials or other changes in the variables of the system.

In the instant environment, the outlets 444 are spaced different material path distances from the manifold block 412, and high precision adjustment means for differing path lengths is provided by a plurality of micrometer adjustment means 446, there being one for each path. More particularly, a knurled handle 448 for shaft 452, disposed in adjustment bearing 450, is operable to minutely advance and retract shaft 452. The knurled handle 448 is thus operable to adjustably set the stroke and coaction of the roller 426 with the flexible tube 420. This in turn adjusts the position of roller 426 relative to tube 424 to thereby affect the initiation and cessation of flow to compensate for path length and any other tolerances. The net effect is to provide essentially simultaneous deposition of precisely the same volume of mixed materials AB on each work piece.

In the upper part of FIGS. 8 and 9, there is shown a cam means 454 which is mounted on the shaft 452 of that pinching means 108. In this end pinch means 108, a switch 456 is disposed on switch block 457 with actuator 458 engagable by cam 454. It will be seen that only one switch is associated with the five separate pinch valve means 108. The switch 456 is also shown on drawing 15A with the reference numeral 456E. This is a limit switch which, when cam 454 engages actuator 458, senses the position in on or off manner of the roller 428 of the pinch valve means 108.

Each of the flexible tubes 420 are sealingly attached to a rigid pipe means 460 at 462 adjacent block 422. Each of the pipe means 460 sealingly extends through the top cover portion 464 of the dispensing chamber. As shown in FIGS. 8 and 9, the cover 464 is formed with a plurality of bores 466 and counterbores 468. A separate sealing assembly 470 coacts with case bore 466 comprising a cover 472 bolted to cover plate 464, which coacts with a compression washer 474 which in turn coacts with the O ring retainer means 476 which contains the sealing O rings for respectively coacting with the tube 460 and counterbore 468 to prevent communication of the interior of the vacuum chamber with outside air. As is apparent from the drawings, the ends 444 of tubes 460 define a fixed line of dispensing stations for the apparatus and the parts are moved thereto.

Figure 11:
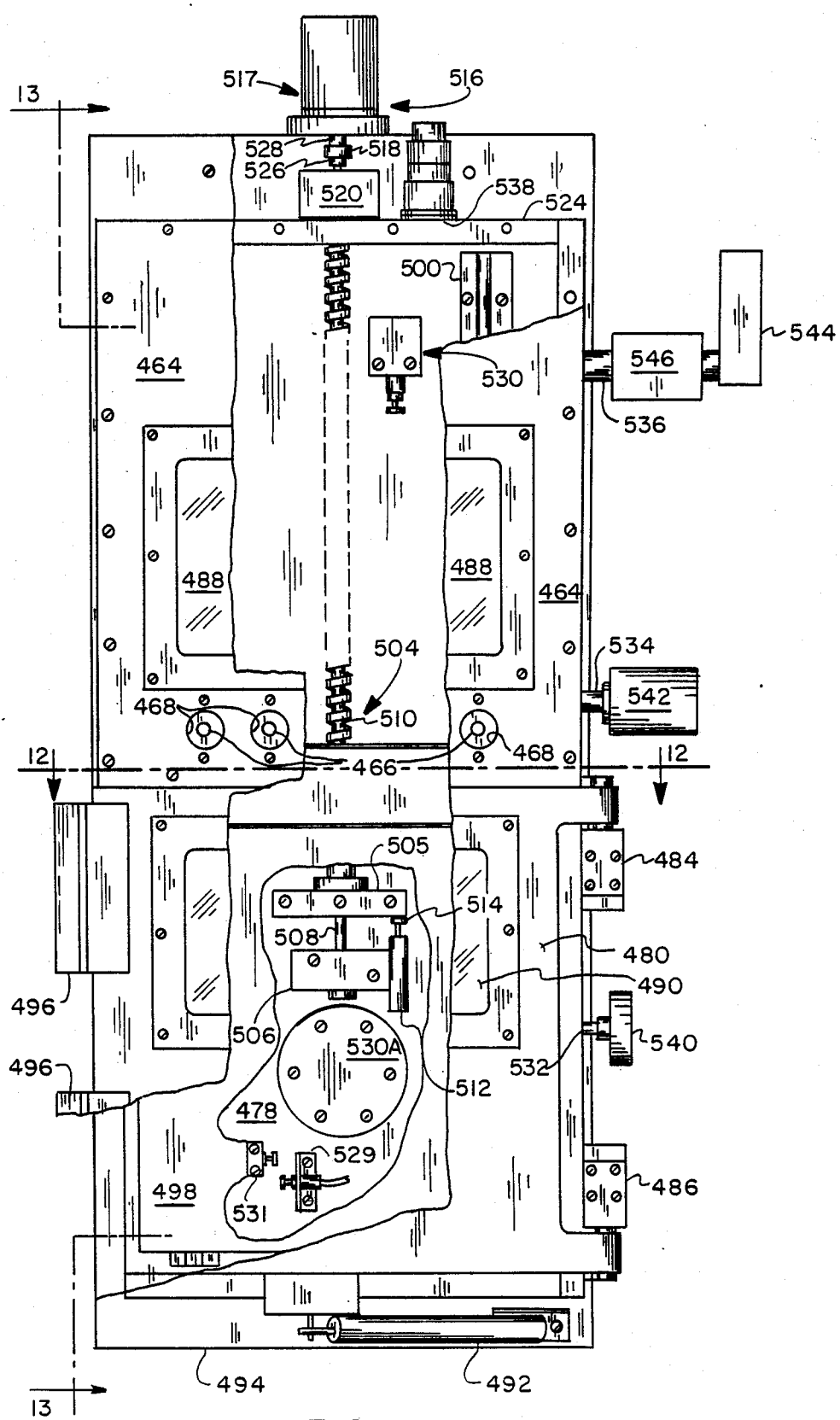
FIG. 11 is an enlarged partial top view, partially in section, of the dispensing chamber and mechanism for moving work pieces therein.

Turning now to FIGS. 11–13, the dispensing chamber means 100 is rectilinear in shape and formed with a bottom plate 478 which rests on the horizontal part of the frame means as shown in FIG. 1. The top cover has a movable portion 480 and a fixed portion 464. The movable portion 480 is hinged at the rear at 484–486 and is latchable to the front side portion 487 by suitable latch means 491 (see FIGS. 1–2). A latch switch door interlock 491E is shown diagrammatically in FIG. 15A and is wired to digital I/O 83g. It may be of any conventional design and its on/off position senses whether the movable portion 480 is in open or closed position. Shown in FIG. 11 are three of the five counterbores 468 and tube receiving bores 466 for the sealing assemblies 470 for the passageway tubes 460, with the others being cut away (without the tubes 420, etc.) in the mid-portion adjacent the lower edge of the fixed portion 464. As aforementioned this is the area of the fixed material delivery stations for the apparatus.

It will be seen that both of the fixed and movable portions 464-480 of the cover have a clear see-through to work piece viewing portions 488 and 49 respectively sealingly attached to the said fixed and moving portions. The latchable movable top cover 480 may have a conventional gas/spring cartridge member 492 attached thereto and to side 494 to hold the movable cover in elevated position (not shown) for accessing a tray of workpieces. Pull plates 496 at the front edge aid in lifting the cover 480.

Shown in FIG. 12 is a work pan 498 for holding a tray of work pieces within the dispensing assembly chamber. The work pan 498 is mounted for movement on spaced apart guide rails 500-502 which may be fixed to chamber bottom portion 478. As will be appreciated, the work pieces are moved into dispensing position under the individual outlets 444.

The work pan 498 is moved by a precision ball screw means 504, one end of which is fixed to pan 498 at movable traveler block portion 505. A ball bearing end block 506 mounts the end 508 of the precision screw 510. The precision ball/screw mechanism may be of the general type previously described and produced by WARNER ELECTRIC BRAKE and CLUTCH COMPANY of South Beloit, Ill.; The Beaver Precision Products Division. A limit switch 512 having an actuator 514 (see FIG. 11) senses overtravel beyond the extreme "open-cover" starting position of the work table by the engaging position of movable block 504. This switch 512 thus serves a safety function in the system.

Stepper motor means 516 precisely moves the precision ball/screw means 500 to move the work pan 498 on rails 500-502 through the traveler block 505. It is to be understood that the stepper motor means 516 again comprises electrical, electromechanical and electronic components of the indexer/driver/stepper motor (or servo motor) similar to the make up of the motion control means 54 under control of the computer 83 and its components, peripherals, software and the status of other components, sensors, signals, etc. above discussed. However, in this motion control, a gear motor means is not employed and the motion control means 517 comprises the stepper motor means 516, a coupling 518, a precision bearing block 520 which sealingly mounts to wall 524 of the chamber. It will be seen that the upper end 526 (as viewed in FIG. 11) of the precision screw 510 is coupled to the motor output 528 at a suitable coupling 518.

A limit switch means 530 is positioned in chamber 100 along the travel path of block 505 to sense and indicate the extreme other end of the work pan travel for overtravel protection. A precision proximity switch 529 and probe 531 are respectively mounted on plate 478 and the work pan 498 to sense the "0" or home position. The proximity switch is preferred to a limit switch for "0" or home position since repeated operations do not require physical contact and thus wear or alignment is not changed with usage. Suitable proximity switches 531 and 313 may be of the type sold by OMRON TATEISI ELECTRONICS COMPANY which have several sales outlets, one of which is in the Chicago area. These switches are operable on 24 volts DC. The output voltage of the proximity switches is shown in Figure 15B leading to the computer CPU83. A shown in block electrical FIG. 18, the proximity switches are a part of the locating switches and sensors block 83y which are located so as to be actuated by the pan 498 and are wired to the input/output board on the indexer 83Z. It will be appreciated that the output voltages of the proximity switches are a function of the vertical and horizontal distances of the probe and sensor. Very fine adjustment of home position is obtainable by interrelating the stepper motor position with a particular output voltage of the proximity switches.

Very high order of precision of start, stop, travel and reverse movement of the pan 498 on precision rails 500-502 under the drive of the motion control means 517 is available due to the programmability of the motion control means and the microstepping of the stepper motor means 516 into 25,000 separate increments per revolution. Of course the pitch of the screw threads on the precision ball/screw 510 further refine the travel increments, for precision dispensing placement of the work parts located on the pan Sealable openings 530, 532, 534, 536, 538 are spaced about chamber 100. Opening 530 is located in the bottom 478 and together with removable plug 530A is for sporadic clean out operations only.

Opening 532 sealingly mounts an output transducer 540 which senses pressure. Preferably it is a solid state device of piezoresistive characteristics which will give a electrical output signal to measure the vacuum in the chamber 100 and gives a signal in voltage to the computer through the I/O analog board 83d of peripheral 83c. The transducer 540 will provide a variable voltage which is directly responsive to the pressure of the chamber, which voltage is then read by the peripheral and the host CPU 83, so as to be a part of the operation of the apparatus 40. One such pressure transducer 540 type found appropriate is Model PX140 manufactured by OMEGA ENGINEERING COMPANY of Stanford, Conn. It is also shown in the electrical schematic as 540E in FIG. 15D, which may be using the 8 volts DC current from the rectified DC power supply (middle of FIG. 15B) which is reduced down to 8 volts DC as shown at the bottom of FIG. 15C. Each of the A and B vacuum tanks 84,144 also have similar pressure transducers 84E and 144E respectively associated therewith (shown in FIG. 15D but not otherwise shown) and they also receive their power, as does sensor 540E from the stepped down 15 volts DC to 8 volts DC shown at the bottom of FIG. 15. The signals from the transducers are received at the CPU 83 in the circuitry shown where the information is used as a part of the operating sequence.

Opening 534 sealingly mounts a valve 542 which controls a quick exit or vent of the vacuum (a dump) in chamber 100. It is a solenoid type valve having on/off characteristics. It is also shown in FIG. 15A, the electrical schematic as 542E. It is under control of the computer through board 83e.

Opening 536 is connected to and mounts a vacuum pump 544 and vacuum valve mechanism 546. The vacuum pump 544 may be of the type manufactured by PIAB USA, Inc. of Hingham, Mass. as Model 125 which is a multi-chambered pumping apparatus that lets the air expand in controlled steps in several chambers internal of the pump. It has relatively high air flow capacity and high vacuum capability and operates by compressed air (connections not shown in FIG. 11). It is shown as Reference No. 544P in schematic FIG. 14. Suitable pressure regulator 544P-1, pressure gauge 544P-2 and input air valve 544P-3 are provided intermediate air pressure source 275 and exhaust manifold 101 shown in FIG. 14. It will be appreciated each of these are of conventional design. The vacuum valve 546P is under the control of the computer an is electrically operated by a solenoid which is shown schematically at 546PE in FIG. 15A.

Opening 538 sealingly mounts the electrical connection wires to switches 512 and 530. Switch 512 is an overtravel limit switch (forward limit) of any suitable design which is shown in electrical schematic FIG. 15B as Ref. No. 512E. Switch 530 is a back limit switch which will detect overtravel in the reverse or backward direction, and is shown as Ref. No. 530E on FIG. 15B.

It will be appreciated that the apparatus 40 employs a user source of compressed air supply 275. FIG. 14 is a diagrammatic view of the air systems employed, air being used for cost considerations in some of the system. The house air source 275 is preferably circulated from the source throughout the system and returned through an exhaust manifold means 101. After entering (as shown in FIG. 14) it may enter an appropriate regulator filter 275A when valve 275B permits air to flow. The line has a pressure switch 275C (transducer) as shown. The air flows under pressure into storage tanks 276 and 278 and throughout the system with suitable hose connections shown only semi-diagrammatically.

Each of the three vacuum chambers (the two tanks and the dispensing chamber) have rotatably movable shafts extending therethrough. Because vacuums are impressed upon the seals and bearings for these movable shafts, there is a tendency to cause the lubrication to leave the seals and bearings and thereby shorten the life thereof. To offset this, a commercially available pressure primer system 84PS, 144PS and 100PS is provided to force oil into the seals and bearings for replacement of the vacuum removed oils. This is shown in the upper left portion of FIG. 14.

Control box means 600 for operator operation control is shown in FIG. 1. Various indicating dials and switches are located there. More particularly the main power start on/off switch 602 and emergency stop switch 604 are located here for easy access. (See 602E and 604E in FIG. 15A. The regular 24 volt on/off start switch 603E may be located here. The master control relay 604ER is also shown).

As shown in FIG. 15A and in FIG. 1, the box 600 may also mount the on/off purge switch 606, a cycle start switch 608, and a cycle stop switch 610 with indicator light 610A in the 24 volt circuit associated with I/O board 83g. They are shown in block diagram FIGS. 18 as 83s. It is to be noted than an air pressure indicator 612 (shown in FIG. 14) associated with the pinch valve means operator 442 shows that the pinch valve mean is operable because of pressure being available to power same.

OPERATION

To operate the system, the operator will make sure that valves 394 and 396 are in correct position and will turn on the main air valve 275B and the main power switch 602 at control box 600. Keyboard 83a is activated and the operator (with the aforementioned software package installed) will press the enter key twice, await the appearance of a preselected symbol on the screen 83b and then enter the software's required preselected second command.

At this juncture the software causes the screen to show STATUS of "halted" and the ROUTINES will be blank. Four commands will be available via the keyboard:
S—Start
E—Edit
C—Clean purge tray
X—Exit.

The software is such that a "part number" (previously stored in the memory of the CPU 83) has to be selected, and if "S" for start is pressed without such a part number, an abort condition will register. If "E" is entered via the keyboard as the edit command, the CPU apparatus is placed in an edit mode whereupon a selection of self evident screen commands become available:
C—Change part number
D—Delete part number
R—Rename part number
U—Utilities
J—Jog
X—Exit.

Upon typing the letter "C" when in edit mode, a directory will appear on the screen which will list the part numbers stored in the memory. A choice is now presented, either to enter an existing part number or a new one for the work piece under operator consideration.

At this point, either new information may be inputted or stored information may be reviewed. The screen will (if "yes" to the screen question of review is selected) show the following:
Worktable 498 velocity=0.0000 inches/sec.
No. of shots per row=0
No. of rows this tray=0
Center to center distance=0.0000 inches
Vacuum pour<Y>es<N>o=.

It will be appreciated that any of the numbers may be changed or entered for each part number by following the screen menu commands and typing in the appropriate numbers as operator desires for the work piece under consideration. It will be noted that a variable number of shots on the entire tray of work parts may be provided and the shot size may vary.

The "velocity" of the work table 498 is the speed at which the stepper motor means 516 causes the work table to move between positions. Usually, because the "utilities" of the software so provide, the "initial move" is programmed so that the work table 498 will move from "0" position to the "initial move" position when the start sequence is activated. The "initial move" position is work part size and work part tray size dependent and involves the size of the tray and the location of the center of the tray and location of the home position. By programming this distance between the home or "0" position and the "start dispensing" position of the work part, either by calculating or by jogging to the actual "start dispensing" position and recording same, the first location for dispensing is a known. Thereafter, for second and sequential shots, the center to center distance of the work parts to each other is the key to locational precision in moving to sequential dispensing positions in this system.

The instant apparatus 40 has movement between work piece and dispensing head in only one plane.

Figure 17B:
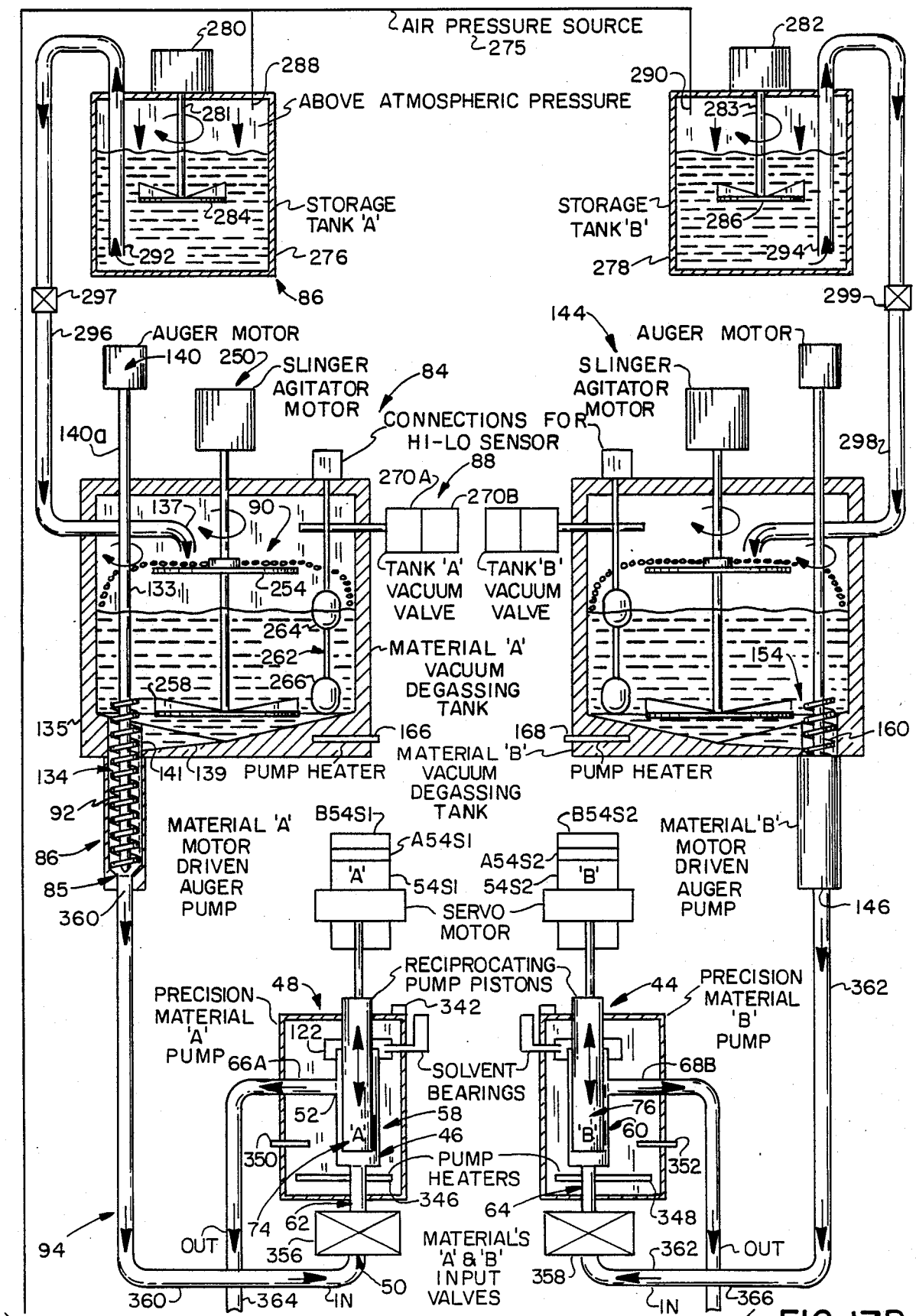
FIG. 17B is a view similar to FIG. 17A showing an alternate form of motor driving mechanism.
Figure 17C:
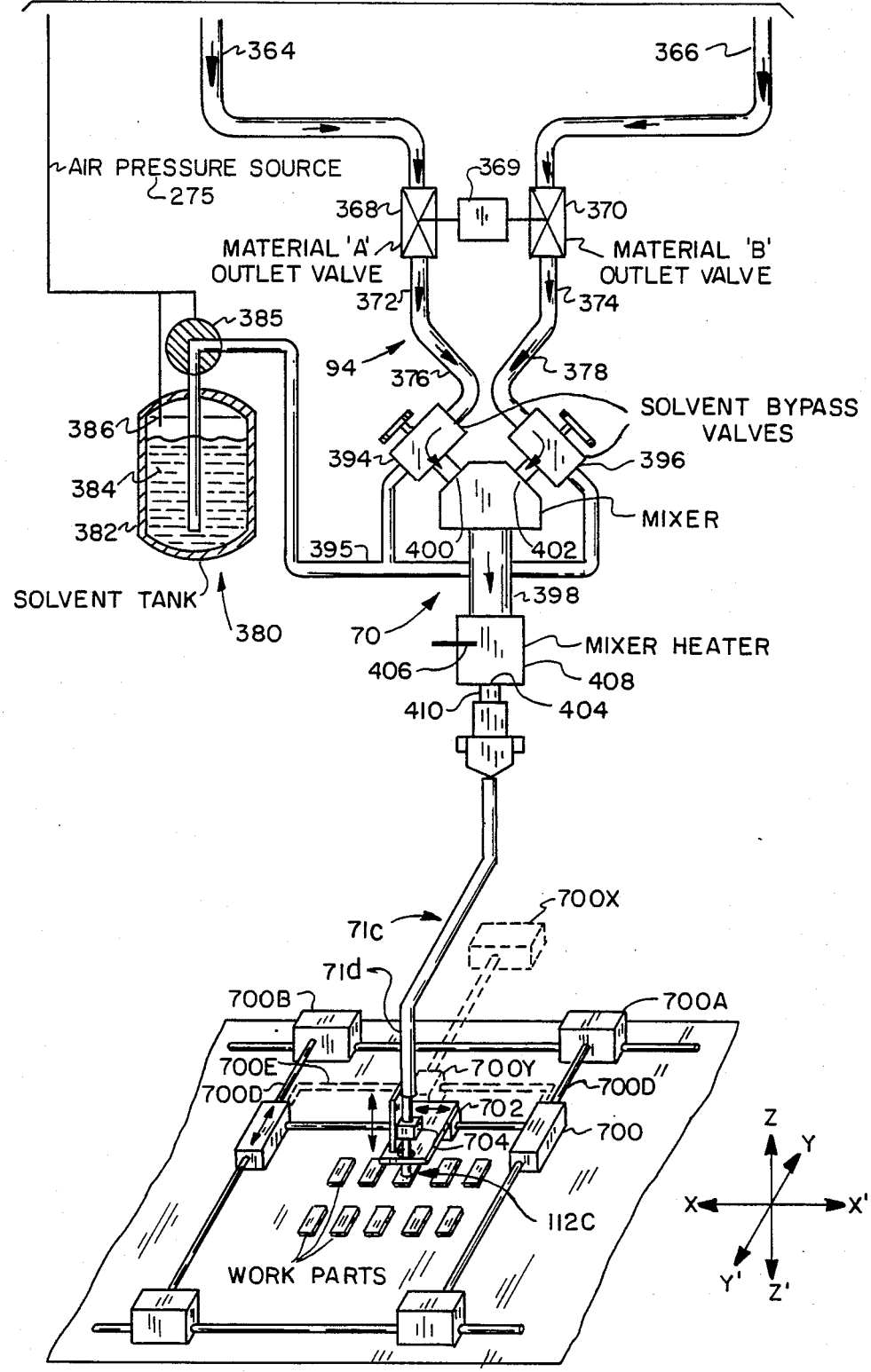
FIG. 17C is a semi-diagrammatic view of an alternative form of the apparatus of FIG. 16B showing a different vacuum dispensing mechanism with dispensing head that moves while the work pieces are stationary.

However OTTOMATION software programs, available at Otto Engineering, Inc., affords 3 plane (X-Y-Z) relative movement of work part and dispensing head(s) (see FIG. 17C). It will also be appreciated that in the programmed sequence for this apparatus 40, the work table 498 will be not moving during each dispensing shot. However this is not an inherent characteristic and continuous pour (or shot) during continuous or interrupted movement of work table is programmable with OTTOMATION software. Also any desired speed and distance of movement of work piece and dispensing head coordination with the control of volume (by control of the motion control) from the dispensing pumps is possible via the software. By use of a stepper motor means (or servo with functionally equivalent control) of the type described for motion control for any movable component (one motor means for each axis), the coordination of components is easily obtained and programmable.

It is to be observed that starting and stopping or go/no go coordination with the sensors and interlocks may be easily programmed with the OTTOMATION software. For example, if dispensing is to occur only when certain conditions are extant (e.g. door 480 is closed, vacuum is present in each of three chambers 84, 100 and 104, temperature at each of the probes is at preselected level, table 498 is in position and any other desired time interval or sensed condition), they are easily accommodated by the software to prevent or permit the occurrence of dispensing. Thus, the apparatus is not limited to vacuum dispensing conditions and the pumping/mixing/ratioing/dispensing concepts herein have a much wider field of application.

The utilities section of the software ca be programmed for complex movements of the pumps and work table. As shown in FIG. 17A, an alternate embodiment, each of the pumps may be separately controlled by separate motion control stepper motor means 54A and 54B. While this adds "cost" to the system, it becomes possible, where a variety of work materials are expected, to exceedingly precisely control the relative movement of each of the pumps to each other through the software program. This will provide adjustable precise ratioing which is operator programmable, all without adjusting any physical parts of the apparatus. Thus, even the minor changes that may occur in batch to batch supplies of A and B work materials may be accommodated for in having ratioing changed to obtain desired AB results.

It will also be appreciated that parameters for all part numbers may be changed when in the edit mode. This is accomplished by entering the "U" command for utilities via keyboard 83b. The screen will provide (via the software) the parameter variables and instructions for inputting either the initial parameters or the change for same such as:

A Multiple Purge—This gives the operator the variable ability to purge the system more than one time.

B Auto Temperature—This gives the operator the ability for turning tank and pump heaters 167E1–167E8, 346E, and 348E automatically on and/or off or continuously off, etc., and to interrelate the temperature to other events (such as disabling the dispensing sequence when there is insufficient temperature of work materials).

C Auto Mixing Head Temperature—This affords the operator the selection of his desires to have the mixing head temperature control and heater 408E be activated during dispensing/pours or not and other coordinations.

D Auto Vacuum—Gives the operator the ability to determine whether the vacuum is automatically sensed and adjusted in tanks 84–144 and chamber 100 and the coordination with other activities of the apparatus.

E Auto Pinch—Gives the operator the programmable options of determining whether pinch valves 108 are to be continuously open or automatically opened and closed during dispensing/pour as well as coordination with the sensors and controls.

F Agitators—Gives the operator the options of determining whether the component agitators 284, 286 are to be in motion and for how long and when in liquid holding/degassing vacuum tanks 84, 144.

G Time Delay Before Pour—Gives the operator the programmable option of programming delay time, that is the time the tray is to be stationary before the next par is poured. This number might change with different viscosity of work liquid mixture AB.

H Delay After Pour—This is operator determinable and this is the time delay that the completed tray of parts are to be left under vacuum before the chamber 100 can be opened. By programming here, the operator can determine when the interlock switch can be activated and deactivated.

I Initial Move Distance—This variable is operator programmably adjustable and involves the center of the work piece part and the distance from center of purge tray to leading edge of the first row of parts coordinated from "0" or from position of the work tray at start sequence. This initial move distance can vary depending on the dimensions of the tray fixture and the work parts.

J Timed Purge—This is the time lapse the operator programs into the computer for preventing curing of the materials during the time the system sits idle with material mixed in the mixing head 70. For example, if a certain 2 part mixed work material AB (such as epoxy resin and hardener) cures in 20 minutes, then you would ideally want timed purge to be set for 10 minutes of delay. This means that if the material has not been moved within a 10 minute time period, the system will automatically purge itself of at least enough material from the pistons 74 and 76 to clear out all mixed material AB located in mixing chamber means 70 downstream to the dispensing outlet means 112.

Depending on the work piece and the dispensing requirements, the operator will set all initial circumstances and operational condition dependent parameters in the system in the memory of the CPU 83 by using the installed software. It is possible to have many, many more variables in the utilities section than those set forth above. For example, a visual sensor (TV camera sensor) not shown, can be used to sense presence or absence of parts on the tray or their correct or incorrect orientation.

After any of all variables on the utilities screen are inserted or previously inserted, parameters are changed (if any), then "S" is entered via the keyboard to the CPU to store them and "U" to use them pursuant to menu commands that appear. The operator then follows menu commands and following the indications of the program, causes the screen to then return to the edit mode and its menu.

It is possible to delete a part number in the edit mode by typing "D" and to view a new or different part number by typing "C" and selecting the desired part number Changes of name of part numbers may be accomplished by entering "R" into the CPU and following the menu process for entering the new name.

As aforementioned, the edit menu contains a jog command. By entering "J" into the CPU, the positions of the pump pistons relative to the cylinders may be jogged and the work table 498 may be jogged. Thus, the setup operator can position parts and locate them physically in addition to pursuant to a calculation. The new "jogged into positions" locations appear on the monitor and thus can then be screen read. Thus any experimentally determined shot size attributes and/or an locational attributes of the work parts can be recorded and then entered into memory for later use in a programmed operation.

Assuming that the operator has the positioning variables entered into CPU 83 memory and after vacuum pour command of yes or no has been entered, a shot number and shot size sub-routine may appear on the screen as follows:

| Shot Number | Size in C.C. |
|---|---|
| <1> | 0.0000 |
| <2> | 0.0000 |
| — | — |
| <7> | 0.0000 |

By typing in the size numbers in whole or fractions of a c.c. opposite the individual shot number of the previously preselected total number of shots, the operator may program an amount to be dispensed on each sequential shot as he will determine. The software in CPU 83 then programs the required amount of pulses to the stepper motor 54 through the indexer 83z motor drive 83n to control the coordinated movement of the pumps 83p and indexing table 83g to obtain the programmed position and-dispensing pour (shot), all by using the broad circuit outline as shown in block diagram FIG. 18 and using the structure and electrical circuits and components heretofore described.

Start up on the screen 83b main menu (opening menu) may be selected after selection of a part number by typing "S". The system running screen for apparatus 40 now will appear. Assuming all utility parameters are active, the screen will show the temperatures and vacuum levels a sensed at 162EP, 164EP, 350EP, 352EP, 406EP, 84E, 144E and 540E in the circuits shown in FIGS. 15A-15D and FIG. 18. It will also show the status of the various other parts of the apparatus through the solenoid control and sensors 83r and user and external switches 83s operating through I/O board 83g, the locating switches and sensors 83y tied to the computer through the indexer I/O board 83z, and the pneumatic control and sensors and external air supply through the circuits shown. In normal operation, there is a heat up time lag until the A and B work materials in the storage vacuum chambers 84-144 obtain proper temperature.

The screen will register a system temperature "go" when the A and B work materials reach appropriate temperature as sensed by the respective probe sensors 162EP and 164EP in the circuits as shown. The software now causes a user message to appear indicating that the vacuum chamber 100 can be closed and a vacuum pulled so that the purge cycle can commence. After appropriate vacuum is obtained, the screen will so indicate and the operator will be told that purge switch 606 can now be activated. Automatic versus operator purging can be programmed also. This activation of purge will last as long as the user desires and if so programmed, a multiple purge cycle is obtained.

After purge, the vacuum is released (dumped) via valve 542E, the work table 498 can be commanded (by typing the requisite command, e.g. "C") to be indexed and moved to the position under the movable cover 480 so that the purge tray can be removed quickly. The menu then informs the operator to insert a part tray and then reclose door 480 and return work table to home starting position through menu commands. The system is now such that mixed material AB is in the mixing means 70 and is entering chemical curing process. Because of this, the system is so arranged that the automatic timed purged cycle previously discussed is commenced to discharge the mixed material and clean the system if the dispensing cycle is not completed. This prevents cured AB materials from curing in situ therein and downstream thereof. It will continue until cycle start button 608 is started.

The screen will now instruct the operator to press switch cycle start button 608 to initiate the pouring/dispensing sequence. Checking of status of the door 480 (it must be closed) appears, a vacuum is drawn on chamber 100, temperatures and vacuum status in the system is checked and operational status is confirmed and if out of tolerance are brought into conformity with the aforementioned programmed preselected parameter standards.

When all sensors indicate the apparatus 40 is ready to function and all interlocks are in correct position, the work tray of parts are indexed to the proper starting position programmed into the CPU memory for the particular part being worked upon. Thus the center of each work piece of the first row of work parts will be positioned directly under the respective outlets 444 to receive the dispensing pour (shot) of material AB, whereupon a short delay will occur and then the parts will be indexed for the positioning of the second row, etc. This sequence continues until all commands in the CPU memory for that part number are completed, which may include several sequential pours (shots) on each work piece. A delay now may be programmed into the sequence to subject the parts to the further degassing vacuum in chamber 100. It will be appreciated that the timed purge sequence commences immediately after the last pour (shot). The parts must now be removed from chamber 100 prior to the expiration of the time cycle on the timed purge, new parts put on the tray, the tray redisposed in chamber 100, the chamber closed so that a new cycle may commence for the new parts to be put in the deposition sequence.

At the end of a cycle, the operator is also presented with the choice of (a) activating the switch cycle start 608 or (b) returning to the main menu to change parts or (c) or commencing an end operation for day (clean up) cycle to purge the system as will be apparent.

The operator may stop or interrupt the normal cycle at any time by pushing cycle stop switch 610. This provides flexibility for operator errors.

ALTERNATE EMBODIMENTS

FIG. 17A shows, in semidiagrammatic form as heretofore briefly mentioned, a portion of the apparatus and system which is similar to FIG. 16A except that the single motion control means 54 is now two separate motion control means 54A and 54B. Because each motion control means 54A and 54B are independently controlled and coordinated with each other and the system components through the OTTOMATION software and the circuitry, the means 55 of physical/mechanical tying of the movement of the pumps together (such as by using a plate 306) is not necessary or required. While the motion control means 54A and 54B are shown with vacuum degassing material supply chambers 84 and 144, it will be appreciated that some applications and usages of a dispensing system do not require same. Also, as noted at the bottom of FIG. 17A, the outlet passageways 364–366 may go to dispensing heads such as shown in FIG. 16B (vacuum chamber batch dispensing) or to a dispensing outlet means 112C (FIG. 17C) which is movable in any one or combination of all three planes X, Y, Z described or to other dispensing heads and work part movers. For example, the work parts may be disposed on a moving belt or other work piece mover, and the dispensing head may move in less than all three X, Y, Z planes. The general type of OTTOMATION software aforementioned will afford operator programmability to the motion of each motion control means and to the movements of the dispensing head means 112C in all three planes.

The apparatus set forth in FIG. 17B is similar to that of FIG. 17A except that servo motor control means 54S1 and 54S2 ar substituted for stepper motor control means 54A and 54B. Servo mechanisms on an installed basis are generally in the range of 1.5 to 2 times as expensive as the equivalent stepper motor mechanism. Typically this type of motion control will require an encoder means A54S1 and A54S2 and tachometer means B54S1 and B54S2 in addition to a driver and indexer of the types described (83n and 83z).

The tachometer means B54S1 and B54S2 typically feed back to the driver and the encoder means typically feeds back to the indexer as will be understood. Servo motor means S541 and S542 are fast and accurate with quite low torque loss, but to operate properly generally require periodic adjustment. Because of the additional complexity in circuit and control of servos, the microstepping steppers previously described are preferred except in the exceptional application where torque loss is a major design parameter. It will be appreciated that a servo motor means such as 54S1 may be substituted for motion control means 54 and 516 shown in FIGS. 16A and B or the motion control means 54A and 54B of FIG. 17A. Also, linear motion sensing means (not shown) may be used in connection with servo motors and fed back into the control feedback system with appropriate effect of determining actual travel and controlling travel distance. Programmability in each case is obtained using OTTOMATION software programs.

FIG. 17C shows an alternate form of dispensing head means 112C which is useful in the apparatus and systems shown in FIGS. 16A, 17A and 17B. It is also useful in systems where the vacuum tanks 84 and 144 are eliminated or bypassed from the system and/or when only a single pump means is used.

In broad brush, Y axis motion control means 700, X axis motion control means 702, and Z axis motion control means 704 are shown diagrammatically. The motion control means 700, 702, and 704 may be linear motors, micro stepping motors with rotary motion translation means, or servo motors in any combination or, particularly in the Z plane, motion control 704 may be a simple two position operator for up and down.

Linear motors (magnetic domain) are commercially available from the aforementioned Compu-motor company.

The system shown usually involves the stationary positioning of workpieces during dispensing and a movable dispensing head. It may be used both in open pour and when a vacuum dispensing chamber is used (not shown). The dispensing manifold 71C will require a flexible tube means 71d to accommodate to movement of head 112C as is well understood. When a vacuum dispensing chamber system is used with the movable head means 112C, a linear motor has the advantage of not needing rotary lubricated seals, but such linear motors are presently limited to relatively light loads. The dispensing head 112C may be formed with single or multiple outlets.

When microstepping stepper motors or servo motors are used, the blocks 700A and 700B mount guide rails. When a linear motor is used, they are a part of the drive mechanism holder of the linear bar with magnetic domains therein. When the stepper motor is used (or a servo) it is a part of a single computer programmable motion control 700X (shown in dotted lines) and precision ball screw which will attach to drive block 700Y through extension 700E to move the dispensing head means 112C on the Y axis on the guide rails 700D.

It is possible, but costly, to have spaced precision ball screws for each axis. Programmable movable heads 112C and associated mechanisms of the aforementioned type (stepper motor, servo motor, and linear motor) precisely and programmably movable in 1, 2 or 3 planes and in combination, are commercially available and may be obtained from Otto Engineering, Inc. of Carpentersville, Ill.

It will be appreciated that the coordination of movement of the head means 112C with the precision pump or pumps will be operator programmably controlled through appropriate circuits with any condition or interlock commanded by the operator when using OTTOMATION software. Also a special stand alone peripheral or insertable "card" for the IBM computer and OTTOMATION software is available from Otto Engineering, Inc. which gives 3 axis simultaneous programmable interrelated control of movement of the head in all three planes which may simultaneously be coordinated with work piece movement.

The various combinations of precision programmable pumping, ratioing/mixing, dispensing head movement and work piece movement with or without vacuum degassing has been show and described. Various changes and modifications in the illustrated embodiments of the invention will suggest themselves to those skilled in the art and can be made without departing from the spirit of the invention. All such changes and alternatives are contemplated as may come within the scope of the appended claims.

I claim:

1. High precision versatile apparatus for positive displacement dispensing of a first work liquid from source means for said first work liquid comprising frame means, pump means having cylinder means and piston means, said cylinder means having inlet means connectable to said source means and outlet means separate from said inlet means, said piston means and said cylinder means being mounted for relative movement to each other to cause positive displacement of said first work liquid receivable from said source means entering through said inlet means and out through said outlet means, one of said cylinder means and said piston means being fixed relative to said frame means and the other being mounted for movement relative to said frame means from a first stop position to a second stop position and a third stop position, motion control means mounted on said frame means for said piston means and said cylinder means to control the relative motion and the relative positions each to the other between said piston means and said cylinder means and thereby the output of work liquid through said outlet means, said motion control means being characterized as being operable to cause said relative movement to:

(a) start and move from said first stop position to said second stop position and thereby displace a first precise portion of said first work liquid through said outlet means, (b) start and move from said second stop position to said third stop position and thereby displace a second precise portion of said first work liquid through said out let means, (c) start and move from said first position to said third position without stopping at said second position and thereby displace said first and second precise portions of said first work liquid through said outlet means, (d) start and move from said second stop position to said first stop position, (e) start and move from said third stop position to said first stop position without stopping at said second stop position; and operator selective adjustable means for controlling said motion control means characterized as being operable to cause said motion control means to move between said first and second, first and third positions and second and third positions in any repeatable or variable selected sequence, at any repeatable or variable selected time or condition dependent interval between such movements, and at a selected constant or variable relative velocity movement whereby versatile positive displacement precision dispensing of said first work liquid receivable from said source means is provided.

2. The apparatus set forth in claim 1 wherein the distance between said first stop position and said second stop position is less than one one-hundred thousandth (0.00001) inches.

3. The apparatus set forth in claim 2 being further characterized and wherein the distance between said second stop position and said third stop position is more than one inch and there are intermediate stop positions between said second stop position and said third stop position, each of which said intermediate stop positions being spaced from each other a distance equal to the distance between said first stop position and said second stop position, said motion control means having the further characteristic of being operable to cause stop and start relative movement of said piston means and cylinder means at any of said first, second, third or intermediate stop positions and to move to and from any other of said first, second, third or intermediate stop positions, and said operator selective adjustable means for controlling said motion control means is operable to program and thereby cause movement of said motion control means between any of said first, second, third or intermediate positions in any repeatable or variable selected sequence at any repeatable or variable selected time or condition dependent interval between such movements.

4. The apparatus set forth in claim 1 wherein said motion control means comprises electrical driver means, controllable pulse stream creating means, said controllable pulse stream creating means being operable to cause said electrical driver means to provide incremental relative motion movement between said piston means and cylinder means, said controllable pulse stream means being operable to send an interruptable stream of electrical pulses to said electrical driver means with each individual pulse being able to cause a tiny incremental unit of movement of said electrical driver means.

5. The apparatus set forth in claim 4 wherein said electrical driver means includes a linear motor/driver, said linear motor/driver being mounted on said frame means and operable to receive said pulse stream to advance and retreat the relative movement of said piston and said cylinder means without rotary motion.

6. The apparatus set forth in claim 4 wherein said electrical driver means includes a mechanical precision ball means and screw means, said screw means being mounted on said frame means for relative rotary motion, and said ball means being operable for causing translation of the rotary motion of said screw means into linear motion for advancing and retreating relative movement of said piston means and said cylinder means.

7. The apparatus set forth in claim 6 wherein said electrical driver means includes servo motor means, drive means for said servo motor means, indexer means for said servo motor means, and means for relating the rotary motion of the servo motor means into electronic/electrical signals for monitoring the position/velocity of the servo motor means for causing said servo motor means to react to commands and to cause said servo motor means to move in discrete partial units of revolution either forward or backward to in turn drive said screw means.

8. The apparatus set forth in claim 6 wherein said electrical driver means of said motion control means further comprises rotary motor means, motor driver means, and indexer means operable to receive high level commands and in turn generate an interruptable pulse stream to said motor driver means to control the output of said motor driver means, said pulse stream being interruptable and controllable to provide selectable frequency and duration of pulses, said rotary motor means being rotatably fixed relative to said frame means to rotatably drive said rotary screw means, said motor driver means being operable to receive said interruptable and controllable pulses to cause controlled rotation of said rotary motor means and thereby of said screw means, whereby the control frequency and duration of said pulse stream provides velocity, acceleration, position and direction of the relative movement of said piston means and said cylinder means to precisely control the flow of first work liquid through said outlet means.

9. The apparatus set forth in claim 8 wherein said rotary motor means is a stepper motor wherein each pulse received is translatable into one step of rotary motion of an order of 0.015° of arc.

10. The apparatus set forth is claim 9 wherein said piston means is fixed relative to said mechanical precision ball means for movement therewith from a retracted position to an advanced position, said mechanical precision ball means is fixed to said piston means, said cylinder means is fixed to said frame means, said piston means has an outer radius, said retracted position of said piston means is located adjacent said outlet means, said cylinder means has an inner radius of a dimension greater than said outer radius of said piston means to permit said first work liquid to flow past said piston means and out said outlet means when said piston means is moved from its retracted position to its advanced position to afford turbulent flushing flow through said cylinder means.

11. The apparatus set forth in claim 10 wherein the means for giving high level commands to said indexer means comprises an operator programmable computer and architecture/software to program said pulse stream.

12. The apparatus set forth in claim 11 wherein there is inlet control valve means for said inlet means, said inlet control valve means having an open position and a closed position, first valve sensing means for sensing the open and closed positions of said valve means, and cooperation means responsive to said sensing means for disabling said drive means when said valve means is in its open position.

* * * * *

UNITED STATES PATENT AND TRADEMARK OFFICE
CERTIFICATE OF CORRECTION

PATENT NO. : 4,921,133

DATED : May 1, 1990

INVENTOR(S) : John O. Roeser

It is certified that error appears in the above-identified patent and that said Letters Patent is hereby corrected as shown below:

Col. 4, line 58, delete "m" and insert -- vacuum --.

Col. 7, line 30, "b" should be -- by --.

Col. 11, line 65, "ar" should be -- are --.

Col. 13, line 29, "mean" should be -- means --.

Col. 15, line 2, "mean" should be -- means --.

Col. 16, line 1, "ar" should be -- are --.

Col. 16, line 21, "a" should be -- as --.

Col. 17, line 26, "ar" should be -- are --.

Col. 19, line 13, delete "49" and insert -- 490 --.

UNITED STATES PATENT AND TRADEMARK OFFICE
CERTIFICATE OF CORRECTION

PATENT NO. : 4,921,133

DATED : May 1, 1990

INVENTOR(S) : John O. Roeser

It is certified that error appears in the above-identified patent and that said Letters Patent is hereby corrected as shown below:

Col. 20, line 34, "a" should be -- an --.

Col. 21, line 11, "an" should be -- and --.

Col. 23, line 34, "ca" should be -- can --.

Col. 24, line 18, "par" should be -- part --.

Col. 25, line 1, after the word "number" insert a period -- . --.

Col. 25, line 12, "an" should be -- any --.

Col. 26, line 14, after "entering" insert -- a --.

Col. 27, line 28, "ar" should be -- are --.

Signed and Sealed this

Second Day of February, 1993

*Attest:*

STEPHEN G. KUNIN

*Attesting Officer*     *Acting Commissioner of Patents and Trademarks*